(12) United States Patent
Shimbo et al.

(10) Patent No.: US 11,987,246 B2
(45) Date of Patent: May 21, 2024

(54) ELECTRONIC CONTROL UNIT

(71) Applicant: Hitachi Astemo, Ltd., Hitachinaka (JP)

(72) Inventors: Kenichi Shimbo, Tokyo (JP);
Tadanobu Toba, Tokyo (JP); Hideyuki Sakamoto, Hitachinaka (JP); Taisuke Ueta, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 360 days.

(21) Appl. No.: 17/428,087

(22) PCT Filed: Feb. 6, 2020

(86) PCT No.: PCT/JP2020/004688
§ 371 (c)(1),
(2) Date: Aug. 3, 2021

(87) PCT Pub. No.: WO2020/162576
PCT Pub. Date: Aug. 13, 2020

(65) Prior Publication Data
US 2022/0118977 A1  Apr. 21, 2022

(30) Foreign Application Priority Data

Feb. 6, 2019 (JP) .................................. 2019-020050

(51) Int. Cl.
*B60W 50/14* (2020.01)
*B60W 30/18* (2012.01)
(Continued)

(52) U.S. Cl.
CPC ........ *B60W 30/18* (2013.01); *B60W 50/0098* (2013.01); *B60W 50/14* (2013.01);
(Continued)

(58) Field of Classification Search
CPC .. B60W 30/18; B60W 50/0098; B60W 50/14; B60W 2530/10; B60W 2530/203;
(Continued)

(56) References Cited

U.S. PATENT DOCUMENTS 7,798,263 B2 * 9/2010 Tandy, Jr. ............. B60T 8/1755
701/1
8,532,870 B2 * 9/2013 Hoetzer .................. B60T 8/248
303/123
(Continued)

FOREIGN PATENT DOCUMENTS

EP  3 335 956 A2  6/2018
JP  H09-269828 A  10/1997
(Continued)

OTHER PUBLICATIONS

International Search Report with English translation and Written Opinion issued in corresponding application No. PCT/JP2020/004688 dated May 12, 2020.

*Primary Examiner* — Jaime Figueroa
(74) *Attorney, Agent, or Firm* — Foley & Lardner LLP

(57) ABSTRACT

An electronic control unit that is installed on a vehicle connected to a trailer and capable of towing the trailer changes travel control of the vehicle according to a type of the trailer when the trailer is connected to the vehicle.

15 Claims, 14 Drawing Sheets

(51) Int. Cl.
*B60W 50/00* (2006.01)
*G07C 5/00* (2006.01)

(52) U.S. Cl.
CPC ......... *G07C 5/008* (2013.01); *B60W 2530/10* (2013.01); *B60W 2530/203* (2020.02)

(58) Field of Classification Search
CPC . B60W 2050/0063; B60W 2050/0075; B60W 2530/205; G07C 5/008; B62D 53/00
USPC ..................................................... 701/1, 29.6
See application file for complete search history.

(56) References Cited

U.S. PATENT DOCUMENTS

| | | | | |
|---|---|---|---|---|
| 8,665,078 | B2* | 3/2014 | Van Wiemeersch | B60W 30/12 340/901 |
| 8,788,176 | B1* | 7/2014 | Yopp | B60W 30/162 701/96 |
| 9,428,188 | B2* | 8/2016 | Schwindt | B60W 30/12 |
| 10,059,161 | B1* | 8/2018 | Salter | B60D 1/26 |
| 10,628,690 | B2* | 4/2020 | Herman | G06T 7/215 |
| 2006/0069475 | A1* | 3/2006 | Gutierrez | G07C 5/085 701/29.6 |
| 2006/0244579 | A1* | 11/2006 | Raab | B60W 10/04 340/438 |
| 2007/0260385 | A1* | 11/2007 | Tandy, Jr. | B60T 8/248 303/140 |
| 2008/0255741 | A1* | 10/2008 | Traechtler | B60T 7/20 701/70 |
| 2009/0125182 | A1* | 5/2009 | Hoetzer | B60T 8/1708 701/300 |
| 2013/0027195 | A1* | 1/2013 | Van Wiemeersch | G08G 1/167 340/431 |
| 2014/0081543 | A1* | 3/2014 | Fry | G07C 5/00 701/70 |
| 2014/0176716 | A1* | 6/2014 | Wallat | B62D 15/025 348/148 |
| 2015/0025766 | A1* | 1/2015 | Mederer | B60T 7/20 701/70 |
| 2015/0066296 | A1* | 3/2015 | Trombley | B62D 13/06 701/41 |
| 2016/0167651 | A1* | 6/2016 | Schwindt | B62D 13/06 382/104 |
| 2017/0341583 | A1* | 11/2017 | Zhang | B60R 1/00 |
| 2018/0251153 | A1* | 9/2018 | Li | G05D 1/0246 |
| 2018/0253608 | A1* | 9/2018 | Diessner | G06V 10/462 |
| 2018/0272941 | A1* | 9/2018 | Bliss | B62D 15/0295 |
| 2018/0273034 | A1 | 9/2018 | Gesch et al. | |
| 2019/0347498 | A1* | 11/2019 | Herman | G08G 1/162 |

FOREIGN PATENT DOCUMENTS

| | | |
|---|---|---|
| JP | 2001-334966 A | 12/2001 |
| JP | 2006-282072 A | 10/2006 |
| JP | 2018-052146 A | 4/2018 |
| JP | 2018-091416 A | 6/2018 |
| JP | 2018-177068 A | 11/2018 |

* cited by examiner

ELECTRONIC CONTROL UNIT

TECHNICAL FIELD

The present invention relates to an electronic control unit installed and used on a vehicle.

BACKGROUND ART

An articulated vehicle includes a towing vehicle and a trailer which is a towed vehicle. There are various vehicle types of trailers depending on applications, but different vehicles types can be connected to the same (common) towing vehicle. Therefore, a user who uses the articulated vehicle for business can reduce the overall vehicle cost and transportation cost by commonly using the towing vehicle for a plurality of types of trailers.

In recent years, technological development aiming at practical application of autonomous driving has been advanced, and a demand for autonomous driving has also increased for large vehicles such as articulated vehicles and trucks. In addition, a demand for driving assistance functions such as peripheral (rear) recognition and prevention of entanglement has also increased for the use on urban roads and general roads where it is difficult to implement the autonomous driving.

If an autonomous driving function and a driving assistance function are increasingly installed in articulated vehicles, for example, it is conceivable to attach various sensors for recognition of objects in an external environment and distance recognition, such as cameras and radars, not only to a towing vehicle but also to a trailer side. Sensor information acquired by the various sensors installed on the towing vehicle or the trailer is collected and processed by an electronic control unit (ECU) installed on the towing vehicle, and necessary autonomous driving and driving assistance are controlled.

A background art in this technical field includes the following PTL 1. Regarding an articulated vehicle, PTL describes that "provided is a vehicle control device capable of improving an energy consumption rate of a driving power source by enabling free run in a situation where deceleration performance of a vehicle is satisfactorily secured when a loading weight of the vehicle is large or when a towed vehicle is towed", and illustrates a technique for controlling an operation (coasting) of the vehicle based on vehicle information (total weight) that changes according to the towed vehicle connected to the vehicle and gradient information of an external environment.

CITATION LIST

Patent Literature

PTL 1: JP 2018-91416 A

SUMMARY OF INVENTION

Technical Problem

Since various vehicle types having different lengths and heights are set according to applications for trailers used in articulated vehicles, sensor configurations (types, the number, attachment positions, and the like of sensors) necessary for the control of the autonomous driving and the driving assistance sometimes differ depending on the vehicle types of the trailers. In this manner, when a plurality of types of trailers having different sensor configurations are connected to a towing vehicle, it is necessary to install an electronic control unit having extremely high performance on the towing vehicle in order to commonly process collection and processing of sensor information from sensors installed on both the towing vehicle and the trailers by the same electronic control unit, and thus, vehicle cost increases. That is, in the articulated vehicle equipped with the autonomous driving function and the driving assistance function, it is difficult to travel by connecting and traveling a plurality of types of trailers to a common towing vehicle, which is a feature of the related art.

In order to solve the above problems, an object of the present invention is to provide an electronic control unit that realizes an articulated vehicle equipped with an autonomous driving function and a driving assistance function and capable of connecting and traveling a plurality of types of trailers to a common towing vehicle similarly to the related art.

In addition, another object of the present invention is to provide an electronic control unit that realizes a vehicle equipped with an autonomous driving function and a driving assistance function at low cost.

Solution to Problem

An electronic control unit according to a first aspect of the present invention is installed on a vehicle connected to a trailer and capable of towing the trailer, and changes travel control of the vehicle according to a type of the trailer when the trailer is connected to the vehicle.

An electronic control unit according to a second aspect of the present invention is installed on a vehicle, and changes travel control of the vehicle according to a type of a chassis forming the vehicle.

Advantageous Effects of Invention

According to the present invention, it is possible to provide the electronic control unit that realizes the articulated vehicle equipped with the autonomous driving function and the driving assistance function and capable of connecting and traveling the plurality of types of trailers to the common towing vehicle.

In addition, it is possible to provide the electronic control unit that realizes the vehicle equipped with the autonomous driving function and the driving assistance function at low cost according to the present invention.

DESCRIPTION OF EMBODIMENTS

Figure 1:
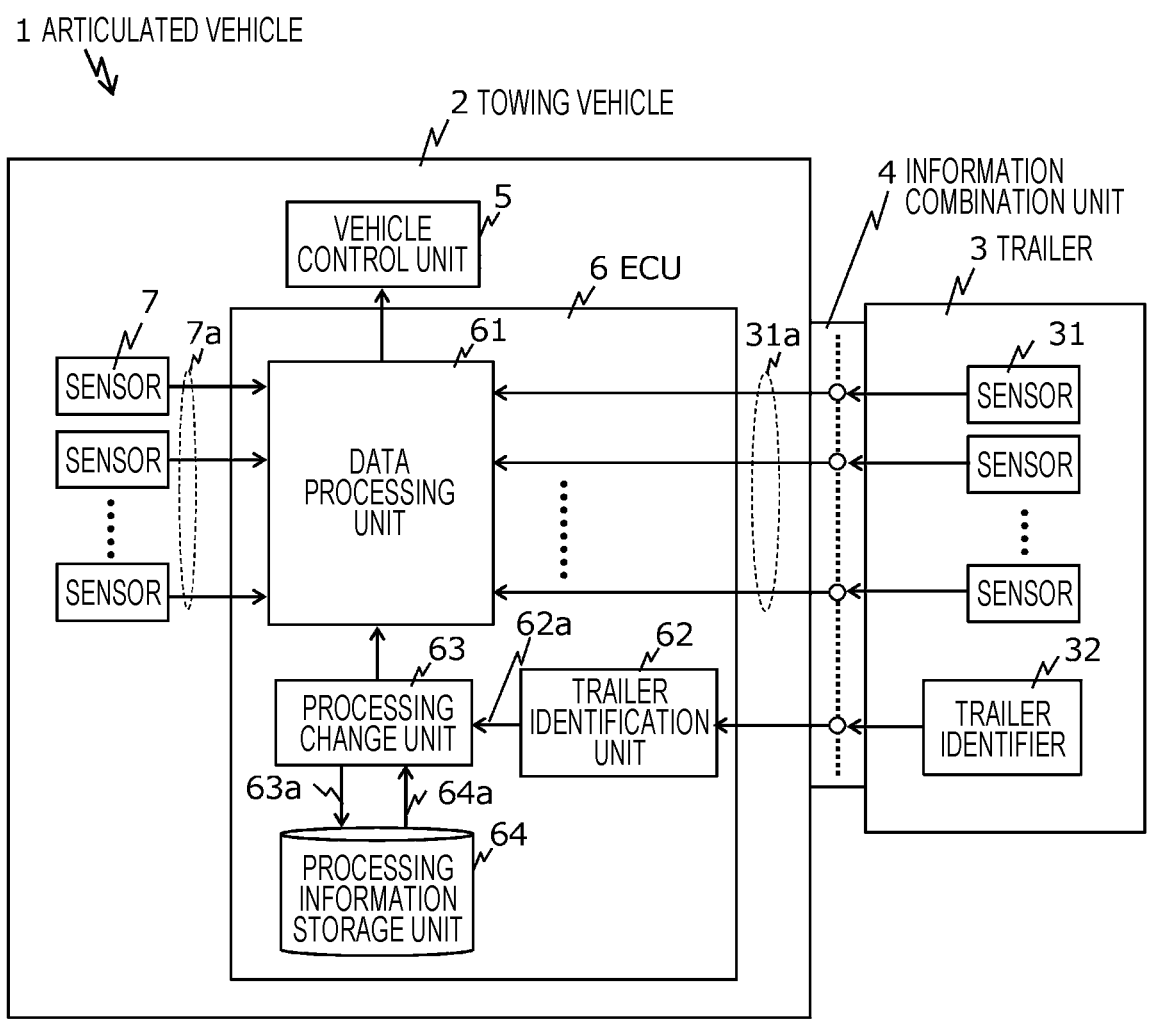
FIG. 1 is a diagram illustrating a configuration of an in-vehicle system according to a first embodiment of the present invention.

Hereinafter, embodiments of the present invention will be described with reference to the drawings. The following description and drawings are examples given to describe the invention, and are appropriately omitted and simplified for clarification of the description. The present invention can be implemented in various other forms. Each component may be singular or plural unless specifically limited.

Positions, sizes, shapes, ranges, and the like of the respective components illustrated in the drawings do not always indicate actual positions, sizes, shapes, ranges and the like in order to facilitate understanding of the invention. Therefore, the present invention is not necessarily limited to the positions, sizes, shapes, ranges, and the like disclosed in the drawings.

When describing identification information, expressions such as "identification information", "identifier", "name", "ID", and "number" will be used, but these expressions can be replaced with each other.

When there are a plurality of components having the same or similar functions, the same reference sign will be sometimes described with different subscripts. When it is unnecessary to distinguish between the plurality of components, however, the subscripts will be sometimes omitted in the description.

In addition, processing performed by executing a program will be sometimes described in the following description, but a subject of the processing may be a processor since the program is executed by the processor (for example, a CPU or a GPU) to perform the prescribed processing appropriately using a storage resource (for example, a memory) and/or an interface device (for example, a communication port). Similarly, the subject of the processing performed by executing the program may be a controller, a device, a system, a computer, or a node having the processor. It suffices that the subject of the processing performed by executing the program is an arithmetic unit, and the subject may include a dedicated circuit (for example, an FPGA or an ASIC) for performing specific processing.

The program may be installed on a device such as a computer from a program source. The program source may be, for example, a program distribution server or a computer-readable storage medium. When the program source is the program distribution server, the program distribution server may include a processor and a storage resource storing a distribution target program, and the processor of the program distribution server may distribute the distribution target program to another computer. In addition, in the following description, two or more programs may be realized as one program, or one program may be realized as two or more programs.

Hereinafter, an electronic control unit for an articulated vehicle according to an embodiment of the present invention and an in-vehicle system configured using the electronic control unit will be described with reference to the drawings.

First Embodiment

FIG. 1 is a diagram illustrating a configuration of an in-vehicle system according to a first embodiment of the present invention. The in-vehicle system performs integrated processing of information from various sensors attached to an articulated vehicle 1, and performs autonomous driving or driving assistance control of the articulated vehicle 1.

The articulated vehicle 1 is configured by combining a towing vehicle 2 and a trailer 3 with each other by an information combination unit 4. Note that, in general, the towing vehicle 2 and the trailer 3 are physically connected by a mechanism called a coupler although not illustrated, so that the towing vehicle 2 and the trailer 3 can travel as the articulated vehicle 1. At this time, it is possible to control a tail lamp, a brake, and the like of the trailer 3 from the towing vehicle 2 by connecting cables of an electrical system and a hydraulic system of the trailer 3 to plugs of the towing vehicle 2, respectively. The information combination unit 4 in FIG. 1 corresponds to cables and connectors configured to transmit sensor information output from one or a plurality of sensors 31 attached to the trailer 3 to an ECU 6 installed on the towing vehicle 2, and may be some of the above-described cables of the electrical system or plugs.

The towing vehicle 2 includes a vehicle control unit 5, the ECU 6, and one or a plurality of sensors 7. Hereinafter, the plurality of sensors 7 will be sometimes collectively referred to as the sensor group 7. The vehicle control unit 5 performs travel control for realizing autonomous driving and driving assistance of the articulated vehicle 1. For example, a steering wheel operation amount, an accelerator amount, and a brake amount of the towing vehicle 2 are controlled, and an obstacle is notified to a driver.

The trailer 3 includes one or a plurality of sensors and stores a trailer identifier 32. Hereinafter, the plurality of sensors 31 will be sometimes collectively referred to as the sensor group 31. The trailer identifier 32 is identification information unique to each type of the trailer 3, and is stored in, for example, a storage element such as a ROM and a flash memory (not illustrated). Alternatively, the trailer identifier 32 may be represented by combining switching states of a plurality of switches. Note that the trailer identifier 32 may be any information as long as the type of the trailer 3 can be identified. For example, unique numbers may be used as the trailer identifiers 32 for the individual trailers 3, respectively, or the common trailer identifier 32 may be allocated to the trailers 3 of the same type.

However, even in the case of the trailers 3 of the same vehicle type, the configuration of the sensor group 31 to be attached may differ depending on a traveling scene and the use of control. Therefore, even in the case of the trailers 3 of the same vehicle type, it is preferable to assign mutually different trailer identifiers 32 if the configuration of the sensor group 31 is different. That is, in the in-vehicle system of the present embodiment, a type of the trailer 3 is set based on at least one of a type, the number, and an attachment position of the installed sensor group 31, and the trailer identifier 32 corresponding to this type is stored in the trailer 3.

The sensor group 7 and the sensor group 31 respectively attached to the towing vehicle 2 and the trailer 3 include, for example, a camera, a millimeter wave radar, laser imaging detection and ranging (LIDAR), an ultrasonic sensor, and the like. In addition, a weight sensor that measures the weight of the vehicle, a tilt sensor that measures a tilt of the vehicle, GPS, and the like may be included. In addition, the sensor group 7 and the sensor group 31 can be configured using an arbitrary single type or a plurality of types of sensors. Sensor information 7a corresponding to a surrounding environment of the towing vehicle 2 output from the sensor group 7 is input to the ECU 2. In addition, sensor information 31a corresponding to a surrounding environment of the trailer 3 output from the sensor group 31 is transmitted to the towing vehicle 2 via the information combination unit 4 and input to the ECU 6.

The ECU 6, which is an electronic control unit, includes a data processing unit 61, a trailer identification unit 62, a processing change unit 63, and a processing information storage unit 64. In the present embodiment, the ECU 6 is configured using, for example, a microcomputer, and the data processing unit 61, the trailer identification unit 62, and the processing change unit 63 are realized as functions of the microcomputer. In addition, the processing information storage unit 64 is realized by a storage element such as a ROM and a flash memory used in combination with the microcomputer.

The data processing unit 61 acquires the sensor information 7a and the sensor information 31a from the sensor group 7 and the sensor group 31, respectively, and executes arithmetic processing related to travel control of the towing vehicle 2 necessary for autonomous driving and driving assistance of the articulated vehicle 1 based on the acquired pieces of the sensor information 7a and 31a. An operation result of the data processing unit 61 is output to the vehicle control unit 5, and is used in the travel control of the towing vehicle 2 performed by the vehicle control unit 5.

When the trailer 3 is connected, the trailer identification unit 62 acquires and refers to the trailer identifier 32 corresponding to a type of the trailer 3 to identify the type of the trailer 3. An identification result of the trailer type by the trailer identification unit 62 is output as trailer identification information 62a from the trailer identification unit 62 to the processing change unit 63.

The processing change unit 63 acquires the identification result of the type of the trailer 3 by the trailer identification unit 62 based on the trailer identification information 62a from the trailer identification unit 62, and changes a content of the arithmetic processing executed by the data processing unit based on the identification result. In the present embodiment, the data processing unit 61 is realized using the microcomputer as described above. Therefore, the processing change unit 63 outputs the type of the trailer 3 indicated by the trailer identification information 62a to the processing information storage unit 64 as trailer vehicle type information 63a, and reads and acquires an arithmetic processing program 64a corresponding to the trailer vehicle type information 63a from the processing information storage unit 64. Then, the acquired arithmetic processing program 64a to the data processing unit 61 is output and executed, so that the content of the arithmetic processing executed by the data processing unit 61 is changed, and the travel control of the towing vehicle 2 performed by the vehicle control unit 5 is changed.

The processing information storage unit 64 stores a plurality of types of arithmetic processing programs corresponding to a plurality of types of the trailers 3 to which the towing vehicle 2 can be connected. Each arithmetic processing program stored in the processing information storage unit 64 can be executed by the microcomputer of the ECU 6, and is set such that optimum arithmetic processing is performed for each type of the corresponding trailer 3. Note that a common arithmetic processing program may be stored in the processing information storage unit 64 collectively for several types of the trailers 3.

When the trailer vehicle type information 63a is input from the processing change unit 63, the processing information storage unit 64 retrieves an arithmetic processing program optimum for the trailer 3 connected to the towing vehicle 2 based on the input trailer vehicle type information 63a. Then, the retrieved arithmetic processing program is output to the processing change unit 63 as the arithmetic processing program 64a corresponding to the trailer 3. As a result, the processing change unit 63 can acquire the optimum arithmetic processing program 64a corresponding to the type of the trailer 3 from among the plurality of types of arithmetic processing programs stored in the processing information storage unit 64.

Here, for example, regarding the trailer 3 (referred to as a trailer A) to which cameras are attached at four corners of a vehicle body as the sensor group 31, the optimum arithmetic processing program 64a corresponds to a program for integrating camera image information on the trailer A side and camera image information on the towing vehicle 2 side based on vehicle information (total length, width, weight, and the like) of the trailer A during connection, and generating and displaying a surround view image showing a state where the entire articulated vehicle 1 is looked down from above, a program for realizing balance (weight distribution) display of the trailer A regarding luggage from an angle of a camera image on the trailer A side, and the like. In addition, for example, regarding the trailer (referred to as a trailer B) to which millimeter wave radars are attached on the left side, the right side, and the rear side of a vehicle body as the sensor group 31, the optimum arithmetic processing program 64a corresponds to a program that calculates object recognition information around the trailer B from radar information on the trailer B side in addition to a camera image and radar information on the towing vehicle 2 side and realizes automatic travel control on a highway and driving assistance control to prevent entanglement at the time of turning right or left in an urban area and collision with other vehicles in front, rear, left, and right directions, and the like. In addition, various programs can be used as the optimum arithmetic processing program 64a corresponding to the trailer 3 for each configuration (type, number, attachment position, and the like of each of the sensors 31) of the sensor group 31 attached to the trailer 3.

When the trailer 3 is connected to the towing vehicle 2, in addition to the sensor information 7a input from the sensor group 7 of the towing vehicle 2, the ECU 6 causes the data processing unit 61 to execute arithmetic processing using the above-described arithmetic processing program 64a by using the sensor information 31a input from the sensor group 31 of the trailer 3. As a result, arithmetic processing necessary for the autonomous driving or the driving assistance control, such as object recognition, object behavior prediction, and route planning, is performed to determine a control content and a control amount for the towing vehicle 2. The determined control content and control amount are transmitted to the vehicle control unit 5, and the travel control of the towing vehicle 2 is performed by the vehicle control unit 5.

Figure 2:
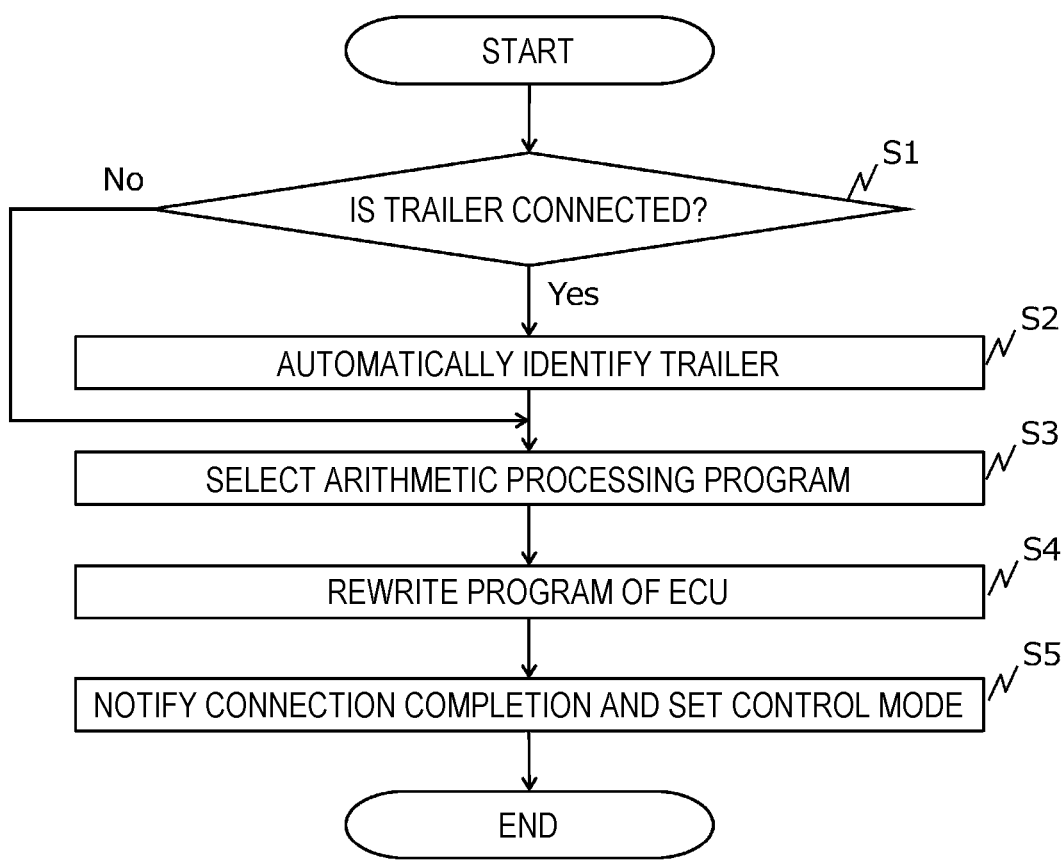
FIG. 2 is a view illustrating an internal processing flow of an ECU according to the first embodiment of the present invention.

FIG. 2 is a view illustrating an internal processing flow of the ECU 6 according to the first embodiment of the present invention. For example, when an ignition switch of the towing vehicle 2 is turned on and the ECU 6 is supplied with power, the ECU 6 starts the processing flow illustrated in FIG. 2.

First, the ECU 6 determines whether the trailer 3 is connected to the towing vehicle 2 in Step S1. This determination is made based on, for example, a connection state of a cable in the information connecting unit 4 and input information from a driver. Note that, during connecting work of the trailer 3, the driver first moves to a position where the towing vehicle 2 can be connected to the trailer 3 in a stopped state, and then, the driver or a worker connects the towing vehicle 2 and the trailer 3. Next, the driver or the worker connects the cables of the electrical system and the hydraulic system of the trailer 3 to the plugs of the towing vehicle 2, and connects the cable of the sensor system to the plug of the towing vehicle 2 in the information connecting unit 4. As a result, the connecting work of the trailer 3 is completed, thereby forming a state where travel as the articulated vehicle 1 is possible. As a result of the determination in Step S1, the processing proceeds to Step S2 when the trailer 3 is connected, and the processing skips Step S2 and proceeds to Step S3 when the trailer 3 is not connected.

In Step S2, the ECU 6 reads the trailer identifier 32 from the trailer 3 by the trailer identification unit 62, and identifies a type of the connected trailer 3 based on the read trailer identifier. Then, information indicating the identified type of the trailer 3 is output to the processing change unit 63 as the trailer identification information 62a.

In Step S3, the ECU 6 causes the processing change unit 63 to select an arithmetic processing program optimum for the current towing vehicle 2 from among the arithmetic processing programs stored in the processing information storage unit 64. At this time, the processing change unit 63 switches a method of selecting an arithmetic processing program according to a determination result of Step S1. That is, when it is determined in Step S1 that the trailer 3 is connected, the arithmetic processing program 64a corresponding to the type of the trailer 3 indicated by the trailer identification information 62a is selected in Step S3 based on the trailer identification information 62a output from the trailer identification unit 62 in Step S2. On the other hand, when it is determined in Step S1 that the trailer 3 is not connected, an arithmetic processing program set in advance for independent travel is selected in Step S3.

In Step S4, the ECU 6 rewrites a program executed by the data processing unit 61 with the arithmetic processing program selected in Step S3. As a result, an arithmetic processing content of the data processing unit 61 is changed to the type of the trailer 3 identified in Step S2 or a type suitable for the towing vehicle 2 to travel alone. Note that, in the arithmetic processing program corresponding to the type of the trailer 3, the arithmetic processing content of the data processing unit 61 is set such that the travel control of the towing vehicle 2 is appropriately performed based on the sensor information 31a from the sensor group 31 attached to the trailer 3 and the sensor information 7a from the sensor group 7 attached to the towing vehicle 2. On the other hand, in the arithmetic processing program for the independent travel, the sensor information 31a from the sensor group 31 attached to the trailer 3 is not used, and the arithmetic processing content of the data processing unit 61 is set such that the travel control of the towing vehicle 2 is appropriately performed based on only the sensor information 7a from the sensor group 7 attached to the towing vehicle 2. After the rewriting of the program is completed in Step S4, appropriate processing is performed to operate the data processing unit 61 using the rewritten program such as restarting the ECU 6 and resetting the data processing unit 61.

In Step S5, the ECU 6 notifies the driver of the completion of the connection of the trailer 3 and notifies the towing vehicle 2 of a set control mode. Here, the type of the connected trailer 3, the control mode corresponding to travel control realized by the rewritten arithmetic processing program, and the like are notified to the driver who is a user of the towing vehicle 2, for example, through display on a display panel installed on a driver's seat. Note that, when it is determined in Step S1 that the trailer 3 is not connected, such a fact may be notified, and the towing vehicle 2 may be notified that the control mode for the independent travel is set.

When the notification to the driver is completed in Step S5, the ECU 6 ends the processing flow illustrated in FIG. 2, and the data processing unit 61 starts execution of arithmetic processing using the rewritten arithmetic processing program.

As described above, the ECU 6 of the towing vehicle 2 can automatically identify the type of the connected trailer 3, and further, change the content of the arithmetic processing for performing the travel control necessary for autonomous driving and driving assistance to an optimum content in accordance with the type of the trailer 3 in the in-vehicle system of the present embodiment. As a result, in the articulated vehicle 1 equipped with an autonomous driving function and a driving assistance function, a specification of the towing vehicle 2 including the ECU 6 can be made common without preparing a high-performance common ECU. Therefore, vehicle development cost of a car manufacturer and vehicle purchase cost of the user can be reduced.

According to the first embodiment of the present invention described above, the following operational effects are achieved.

(1) The ECU 6, which is an electronic control unit, is installed on the towing vehicle 2 that is a vehicle connected to the trailer 3 and capable of towing the trailer 3, and changes the travel control of the towing vehicle 2 according to a type of the trailer 3 when the trailer 3 is connected to the towing vehicle 2. As a result, it is possible to provide the electronic control unit that realizes the articulated vehicle 1 equipped with the autonomous driving function and the driving assistance function and capable of connecting and traveling the plurality of types of the trailers 3 to the common towing vehicle 2.

(2) The ECU 6 includes the data processing unit 61, the trailer identification unit 62, and the processing change unit 63. The data processing unit 61 acquires the sensor information 31a corresponding to a surrounding environment of the trailer 3 output from the sensor group 31 attached to the trailer 3, and executes arithmetic processing related to travel control of the towing vehicle 2 based on the acquired sensor information 31a. The trailer identification unit 62 identifies the type of the trailer 3 (Step S2). The processing change unit 63 changes a content of the arithmetic processing executed by the data processing unit 61 based on an identification result of the type of the trailer 3 by the trailer identification unit 62 to change the travel control of the towing vehicle 2 (Steps S3 and S4). As a result, it is possible to execute optimum arithmetic processing for each type of the trailer 3 using the sensor information 31a and to perform the travel control of the towing vehicle 2.

(3) The data processing unit 61 is configured using a computer. The processing change unit 63 acquires a program corresponding to the type of the trailer 3 identified by the trailer identification unit 62 (Step S3) and causes the computer to execute the acquired program (Step S4) to change the content of the arithmetic processing executed by the data processing unit 61. As a result, the content of the arithmetic processing executed by the data processing unit 61 can be easily changed according to the type of the trailer 3.

(4) The ECU 6 further includes the processing information storage unit 64 that stores a plurality of types of programs that can be executed by the computer. The processing change unit 63 acquires a program corresponding to the type of the trailer 3 from among the plurality of types of programs stored in the processing information storage unit 64. As a result, the program corresponding to the type of the trailer 3 can be easily acquired and executed by the computer.

(5) The trailer identification unit 62 acquires the trailer identifier 32 corresponding to the type of the trailer 3 from the trailer 3, and identifies the type of the trailer 3 based on the acquired trailer identifier 32. As a result, the type of the trailer 3 connected to the towing vehicle 2 can be easily and reliably identified.

(6) The type of the trailer 3 is set based on at least one of a type, the number, and an attachment position of the sensor group 31. As a result, the ECU 6 can perform arithmetic processing appropriate for each of the trailers 3 of the same vehicle type having different configurations of the sensor group 31.

(7) When the trailer 3 is not connected to the towing vehicle 2 (Step S1: No), the ECU 6 acquires the sensor information 7a corresponding to a surrounding environment of the towing vehicle 2 output from the sensor group 7 attached to the towing vehicle 2, and changes the travel control of the towing vehicle 2 so as to perform the travel control of the towing vehicle 2 based on the acquired sensor information 7a. As a result, even when the towing vehicle 2 travels alone without being connected with the trailer 3, the autonomous driving function and the driving assistance function can be appropriately used in the towing vehicle 2.

(8) The ECU 6 notifies a user of a travel control mode of the towing vehicle 2 set according to the type of the connected trailer 3 (Step S5). As a result, the user who is a driver of the towing vehicle 2 can know in advance what kind of travel control is performed.

Second Embodiment

Figure 3:
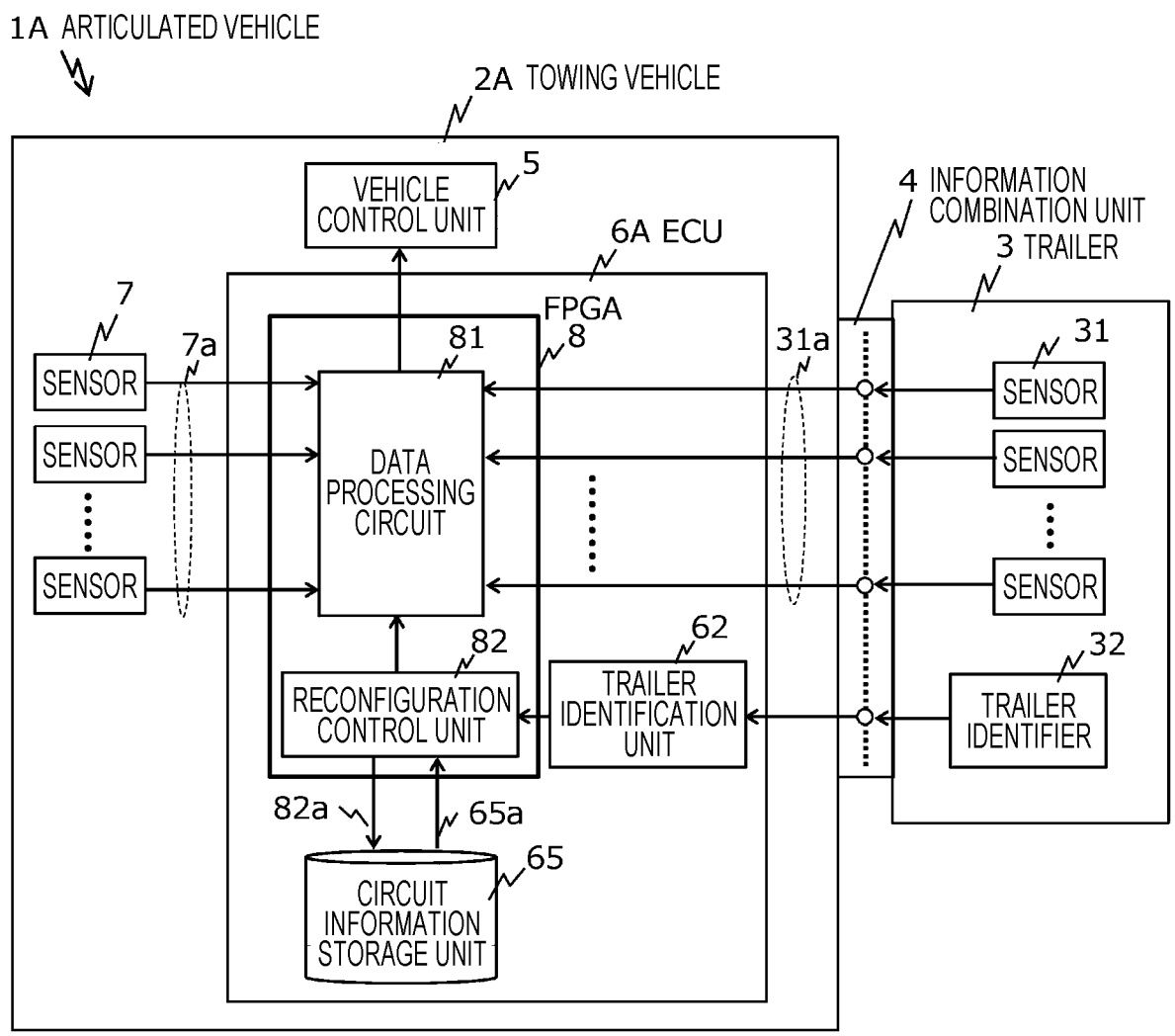
FIG. 3 is a diagram illustrating a configuration of an in-vehicle system according to a second embodiment of the present invention.

Next, a second embodiment of the present invention will be described. FIG. 3 is a diagram illustrating a configuration of an in-vehicle system according to a second embodiment of the present invention. In FIG. 3, the same part as that in FIG. 1 are denoted by the common reference sign as that in FIG. 1. The parts denoted by the common reference sign has the same configuration and operation as that described in the first embodiment, and thus, the description thereof will be omitted below unless otherwise necessary.

In the in-vehicle system illustrated in FIG. 3, an articulated vehicle 1A is configured by connecting a towing vehicle 2A and the trailer 3 to each other by the information combination unit 4. An ECU 6A, which is an electronic control unit, is installed on the towing vehicle 2A. The ECU 6A includes an FPGA 8, the trailer identification unit 62, and a circuit information storage unit 65.

The FPGA 8 is a reconfigurable arithmetic processing circuit in which a plurality of logic circuits are combined, and is configured using a programmable device capable of rewriting internal logic. The FPGA 8 includes a data processing circuit 81 and a reconfiguration control unit 82 therein. Note that the trailer identification unit 62 may be included in the FPGA 8.

The data processing circuit 81 is a part corresponding to the data processing unit 61 in FIG. 1, and acquires the sensor information 7a and the sensor information 31a from the sensor group 7 and the sensor group 31, respectively, and executes arithmetic processing related to travel control of the towing vehicle 2A necessary for autonomous driving and driving assistance of the articulated vehicle 1A based on the acquired pieces of the sensor information 7a and 31a similarly to the data processing unit 61. An operation result of the data processing circuit 81 is output to the vehicle control unit 5, and is used in the travel control of the towing vehicle 2A performed by the vehicle control unit 5.

The reconfiguration control unit 82 is a part corresponding to the processing change unit 63 of FIG. 1, and acquires the identification result of the type of the trailer 3 by the trailer identification unit 62 based on the trailer identification information 62a from the trailer identification unit 62 and changes a content of the arithmetic processing executed by the data processing circuit 81 based on the identification result similarly to the processing change unit 63. In the present embodiment, the data processing circuit 81 is realized using the FPGA 8 as described above. Therefore, the reconfiguration control unit 82 outputs the type of the trailer 3 indicated by the trailer identification information 62a to the circuit information storage unit 65 as trailer vehicle type information 82a, and reads and acquires circuit information 65a corresponding to the trailer vehicle type information 82a from the circuit information storage unit 65. Then, the FPGA 8 is caused to reconfigure the data processing circuit 81 using the acquired circuit information 65a, so that the content of the arithmetic processing executed by the data processing circuit 81 is changed, and the travel control of the towing vehicle 2A performed by the vehicle control unit 5 is changed. That is, the ECU 6A of the present embodiment is configured to utilize a reconfiguration function of the FPGA 8 to rewrite the content of the data processing circuit 81, that is, the logic circuit according to the type of the trailer 3 connected to the towing vehicle 2A.

The circuit information storage unit 65 stores a plurality of types of circuit information corresponding to a plurality of types of the trailers 3 to which the towing vehicle 2A can be connected. Each circuit information stored in the circuit information storage unit 65 is used at the time of reconfiguring the FPGA 8, and a combination of logic circuits capable of executing optimum arithmetic processing is set to be reconfigured in the FPGA 8 for each type of the corresponding trailer 3. Note that common circuit information may be stored in the circuit information storage unit 65 collectively for several types of the trailer 3.

When the trailer vehicle type information 82a is input from the reconfiguration control unit 82, the circuit information storage unit 65 retrieves circuit information optimum for the trailer 3 connected to the towing vehicle 2A based on the input trailer vehicle type information 82a. Then, the retrieved circuit information is output to the reconfiguration control unit 82 as the circuit information 65a corresponding to the trailer 3. As a result, the reconfiguration control unit 82 can acquire the optimum circuit information 65a corresponding to the type of the trailer 3 from among the plurality of types of circuit information stored in the circuit information storage unit 65.

Figure 4:
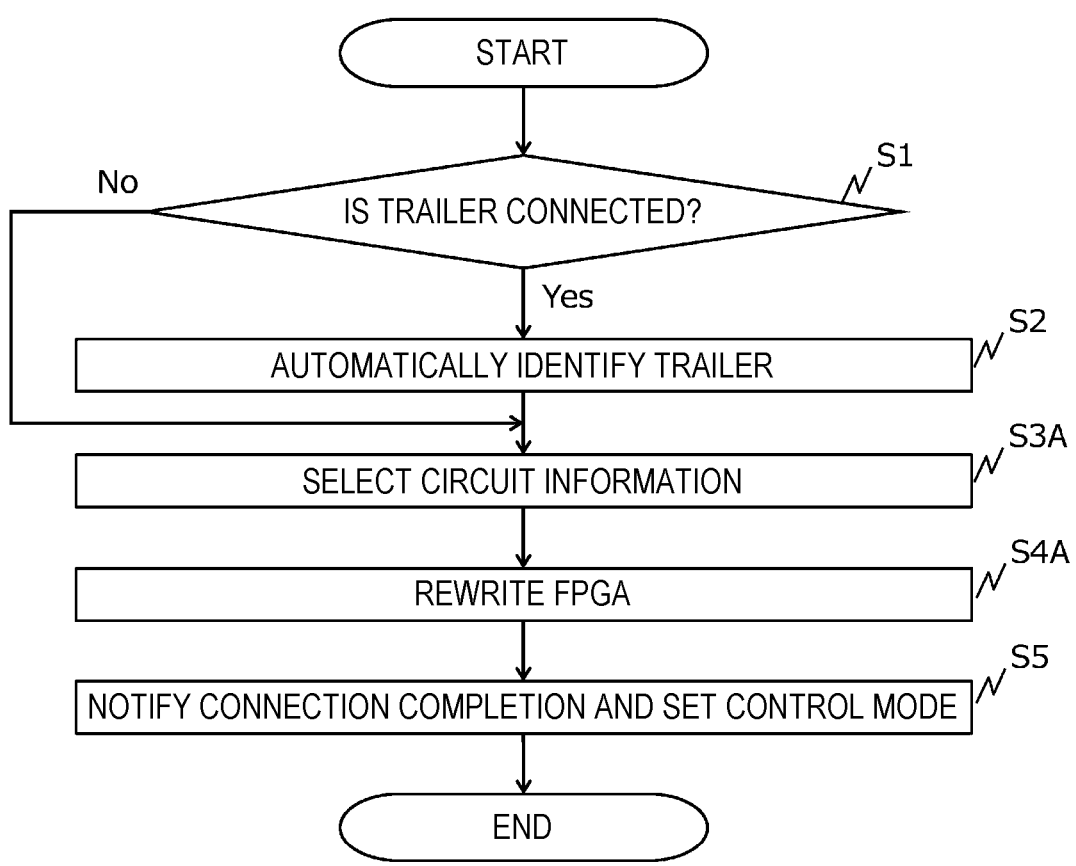
FIG. 4 is a view illustrating an internal processing flow of an ECU according to the second embodiment of the present invention.

FIG. 4 is a view illustrating an internal processing flow of the ECU 6A according to the second embodiment of the present invention. For example, when an ignition switch of the towing vehicle 2A is turned on and the ECU 6A is supplied with power, the ECU 6A starts the processing flow illustrated in FIG. 4. In FIG. 4, processing having the same content as that in FIG. 2 is denoted by the common step number as that in FIG. 2. Hereinafter, the description of the processing denoted by the common step number will be omitted.

In Step S3A, the ECU 6A causes the reconfiguration control unit 82 to select circuit information optimum for the current towing vehicle 2A from among the pieces of circuit information stored in the circuit information storage unit 65. At this time, the reconfiguration control unit 82 switches a method of selecting the circuit information according to a determination result of Step S1. That is, when it is determined in Step S1 that the trailer 3 is connected, the circuit information 65a corresponding to the type of the trailer 3 indicated by the trailer identification information 62a is selected in Step S3A based on the trailer identification information 62a output from the trailer identification unit 62 in Step S2. On the other hand, when it is determined in Step S1 that the trailer 3 is not connected, circuit information set in advance for independent travel is selected in Step S3A.

In Step S4A, the ECU 6A rewrites the FPGA 8 by reconfiguring the data processing circuit 81 in the FPGA 8 using the circuit information selected in Step S3A. As a result, an arithmetic processing content of the data processing circuit 81 is changed to the type of the trailer 3 identified in Step S2 or a type suitable for the towing vehicle 2 to travel alone.

As described above, the ECU 6A of the towing vehicle 2A can automatically identify the type of the connected trailer 3, and further, change the content of the arithmetic processing for performing the travel control necessary for autonomous driving and driving assistance to an optimum content in accordance with the type of the trailer 3 even in the in-vehicle system of the present embodiment, which is similar to the first embodiment. As a result, in the articulated vehicle 1A equipped with an autonomous driving function and a driving assistance function, a specification of the towing vehicle 2A including the ECU 6A can be made common without preparing a high-performance common ECU. Therefore, vehicle development cost of a car manufacturer and vehicle purchase cost of the user can be reduced.

Further, the content of the arithmetic processing for performing the travel control necessary for autonomous driving and driving assistance is realized by the reconfigurable logic circuit, such as the FPGA 8, in the in-vehicle system of the present embodiment. As a result, the content of the arithmetic processing can be easily changed, and processing can be performed at a higher speed than a CPU or a microcomputer by parallelization of processes or pipeline processing, and thus, it is possible to realize the articulated vehicle 1A corresponding to the high-performance autonomous driving and driving assistance.

According to the second embodiment of the present invention described above, the following operational effects are further achieved in addition to (1), (2), and (5) to (8) described in the first embodiment.

(9) The data processing circuit 81 is configured using the FPGA 8 that is a reconfigurable arithmetic processing circuit in which a plurality of logic circuits are combined. The reconfiguration control unit 82 acquires circuit information corresponding to a type of the trailer identified by the trailer identification unit 62 (Step S3A), and reconfigures the FPGA 8 using the acquired circuit information (Step S4A) to change a content of arithmetic processing executed by the data processing circuit 81. As a result, the content of the arithmetic processing executed by the data processing circuit 81 can be easily changed according to the type of the trailer 3.

(10) The ECU 6A further includes the circuit information storage unit 65 that stores a plurality of types of circuit information for reconfiguring the FPGA 8. The reconfiguration control unit 82 acquires circuit information corresponding to the type of the trailer 3 from among the plurality of types of circuit information stored in the circuit information storage unit 65. As a result, it is possible to easily acquire the circuit information corresponding to the type of the trailer 3 and reconfigure the FPGA 8.

Third Embodiment

Figure 5:
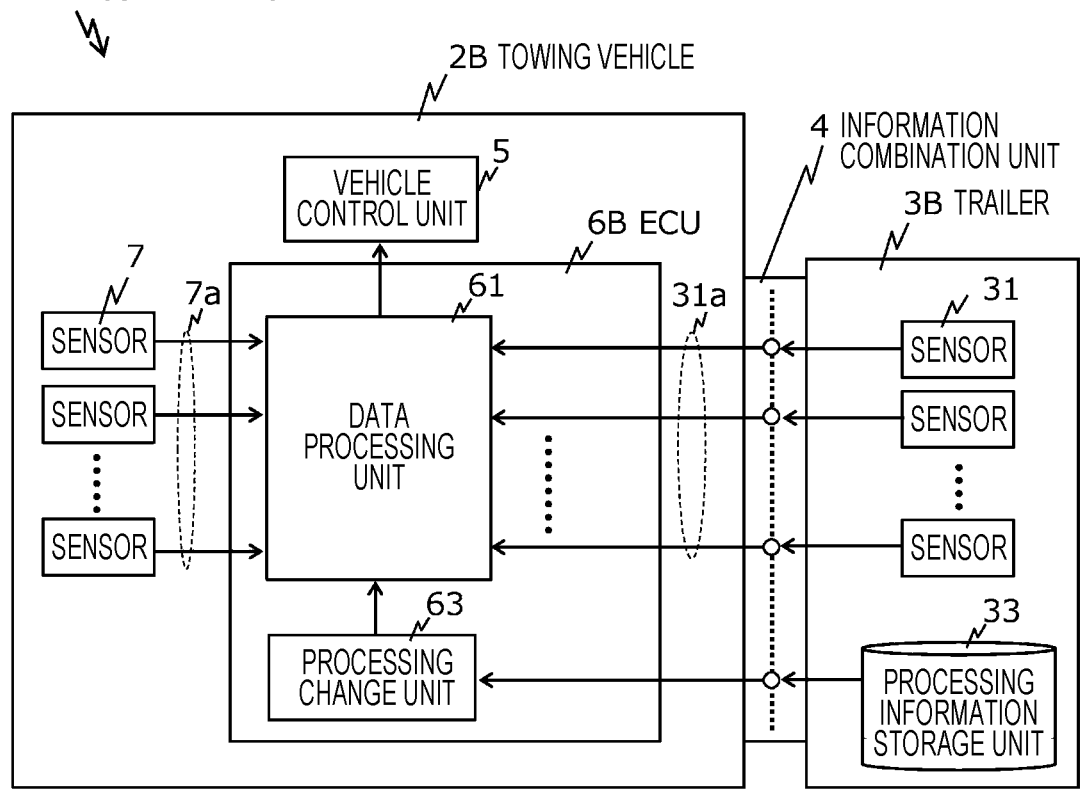
FIG. 5 is a diagram illustrating a configuration of an in-vehicle system according to a third embodiment of the present invention.

Next, a third embodiment of the present invention will be described. FIG. 5 is a diagram illustrating a configuration of an in-vehicle system according to a third embodiment of the present invention. In FIG. 5, the same part as that in FIG. 1 are denoted by the common reference sign as that in FIG. 1. The parts denoted by the common reference sign has the same configuration and operation as that described in the first embodiment, and thus, the description thereof will be omitted below unless otherwise necessary.

In the in-vehicle system illustrated in FIG. 5, an articulated vehicle 1B is configured by connecting a towing vehicle 2B and a trailer 3B to each other by the information combination unit 4. An ECU 6B, which is an electronic control unit, is installed on the towing vehicle 2B. The ECU 6B includes the data processing unit 61 and the processing change unit 63. The trailer 3B includes the sensor group 31 and the processing information storage unit 33. That is, in the in-vehicle system of the present embodiment, the processing information storage unit 33 corresponding to the processing information storage unit 64, provided in the ECU 6 side in the first embodiment, is provided in the trailer 3B, instead of the trailer identifier 32 of FIG. 1 described in the first embodiment.

As a characteristic of the processing information storage unit 33 provided in the trailer 3B, arithmetic processing programs corresponding to a plurality of types of the trailers 3 are not stored, and only a program for the trailer 3B is stored, which is different from the processing information storage unit 64 described in the first embodiment.

Figure 6:
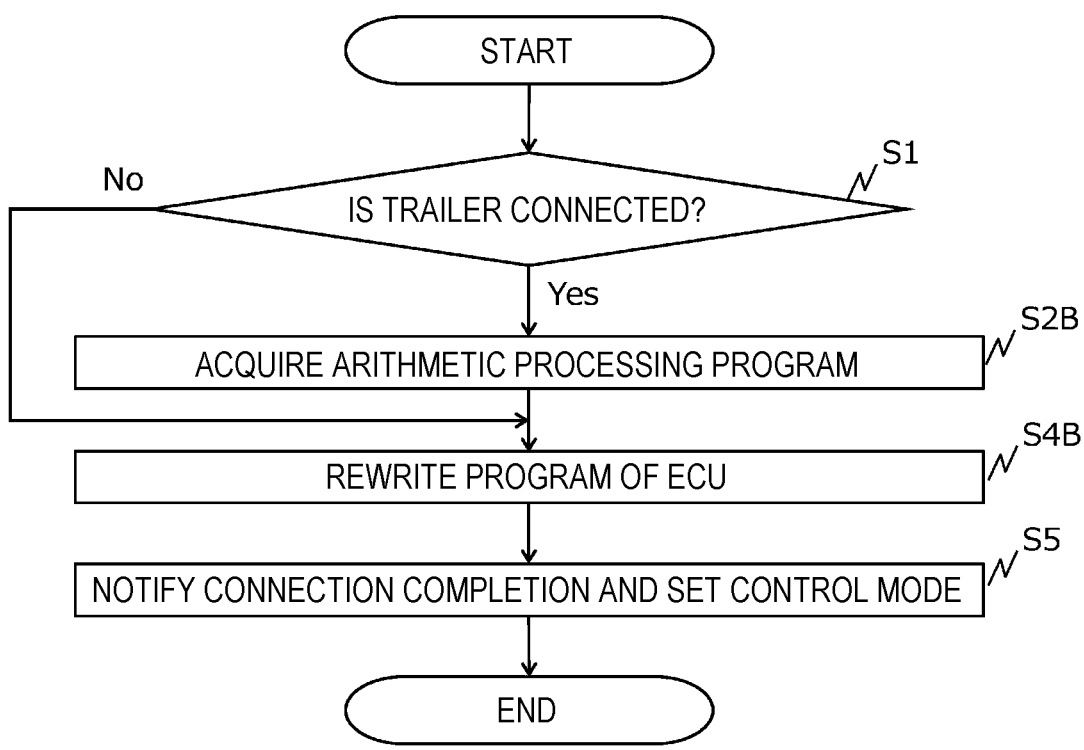
FIG. 6 is a view illustrating an internal processing flow of an ECU according to the third embodiment of the present invention.

FIG. 6 is a view illustrating an internal processing flow of the ECU 6B according to the third embodiment of the present invention. For example, when an ignition switch of the towing vehicle 2B is turned on and the ECU 6B is supplied with power, the ECU 6B starts the processing flow illustrated in FIG. 6. In FIG. 6, processing having the same content as that in FIG. 2 is denoted by the common step number as that in FIG. 2. Hereinafter, the description of the processing denoted by the common step number will be omitted.

In Step S2B, the ECU 6B recognizes the processing information storage unit 33 installed on the trailer 3B, and reads and acquires an arithmetic processing program stored in the processing information storage unit 33.

In Step S4B, the ECU 6B rewrites a program executed by the data processing unit 61 with the arithmetic processing program acquired in Step S2B. As a result, an arithmetic processing content of the data processing unit 61 is changed to a content corresponding to the trailer 3B connected to the towing vehicle 2B. Note that the process in Step S2B is not executed when it is determined in Step S1 that the trailer 3 is not connected, and thus, the arithmetic processing program is not acquired. In this case, the data processing unit 61 may be caused to execute an arithmetic processing program for independent travel set in advance in the ECU 6B.

As described above, the ECU 6B of the towing vehicle 2B can change the content of arithmetic processing for performing the travel control necessary for autonomous driving and driving assistance to an optimum content in accordance with the type of the connected trailer 3B even in the in-vehicle system of the present embodiment, which is similar to the first and second embodiments. As a result, in the articulated vehicle 1B equipped with an autonomous driving function and a driving assistance function, a specification of the towing vehicle 2B including the ECU 6B can be made common without preparing a high-performance common ECU. Therefore, vehicle development cost of a car manufacturer and vehicle purchase cost of the user can be reduced.

Further, the processing information storage unit 33 is provided in the trailer 3B in the in-vehicle system of the present embodiment, so that the ECU 6B does not need a storage medium configured to store an arithmetic processing program, and it is sufficient for the processing information storage unit 33 in the trailer 3B to have the memory capacity capable of storing only one type of program unique to the trailer 3B. As a result, it is possible to reduce cost of the ECU 6B and the towing vehicle 2B equipped with the ECU 6B while suppressing an increase in cost of the trailer 3B, and to realize the cost reduction of the entire articulated vehicle 1B.

According to the third embodiment of the present invention described above, the following operational effects are further achieved in addition to (1) and (6) to (8) described in the first embodiment.

(11) The ECU 6B includes the data processing unit 61 and the processing change unit 63. The data processing unit 61 acquires the sensor information 31a corresponding to a surrounding environment of the trailer 3B output from the sensor group 31 attached to the trailer 3B, and executes arithmetic processing related to travel control of the towing vehicle 2B based on the acquired sensor information 31a. The processing change unit 63 acquires an arithmetic processing program, which is processing information corresponding to a type of the trailer 3B, from the trailer 3B, and changes a content of the arithmetic processing executed by the data processing unit 61 based on the acquired arithmetic processing program to change the travel control of the towing vehicle 2B. As a result, it is possible to execute optimum arithmetic processing for each type of the trailer 3B using the sensor information 31a and to perform the travel control of the towing vehicle 2B.

Note that, in the third embodiment of the present invention described above, the description has been given regarding the example in which the content of the arithmetic processing is changed for the data processing unit 61 configured using a computer similarly to the first embodiment by acquiring the arithmetic processing program from the processing information storage unit 33 installed on the trailer 3B. However, the data processing circuit 81 may be configured using the FPGA 8, and the content of the arithmetic processing executed by the data processing circuit 81 may be changed by reconfiguring the FPGA 8, which is similar to the second embodiment. In this case, a circuit information storage unit storing circuit information corresponding to the trailer 3B may be installed on the trailer 3B, instead of the processing information storage unit 33 storing the arithmetic processing program corresponding to the trailer 3B.

Fourth Embodiment

Figure 7:
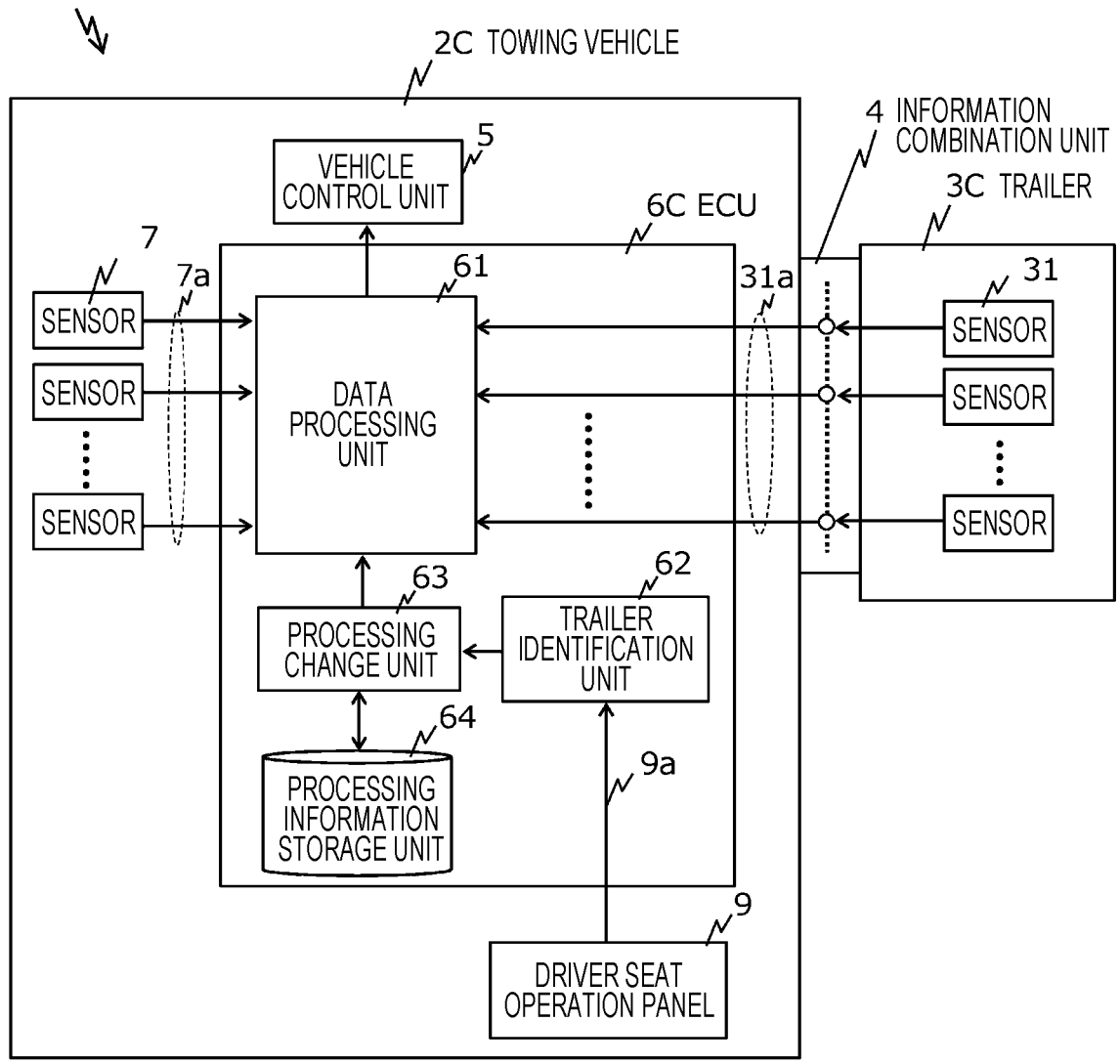
FIG. 7 is a diagram illustrating a configuration of an in-vehicle system according to a fourth embodiment of the present invention.

Next, a fourth embodiment of the present invention will be described. FIG. 7 is a diagram illustrating a configuration of an in-vehicle system according to a fourth embodiment of the present invention. In FIG. 7, the same part as that in FIG. 1 are denoted by the common reference sign as that in FIG. 1. The parts denoted by the common reference sign has the same configuration and operation as that described in the first embodiment, and thus, the description thereof will be omitted below unless otherwise necessary.

In the in-vehicle system illustrated in FIG. 7, an articulated vehicle 1C is configured by connecting a towing vehicle 2C and a trailer 3C to each other by the information combination unit 4. The towing vehicle 2C is equipped with an ECU 6C, which is an electronic control unit, and an operation panel 9 installed near a driver's seat. The ECU 6C includes the data processing unit 61, the trailer identification unit 62, the processing change unit 63, and the processing information storage unit 64, which is similar to the ECU 6 described in the first embodiment. The trailer 3C includes the sensor group 31. That is, in the in-vehicle system of the present embodiment, the operation panel 9 configured to change an arithmetic processing content of the data processing unit 61 by manual operation is provided in the towing vehicle 2C, instead of the trailer identifier 32 of FIG. 1 described in the first embodiment.

The operation panel 9 includes an operation switch for a driver to select a type of the trailer 3C connectable to the towing vehicle 2C, and is configured using, for example, a touch panel display or the like. After connecting the trailer 3C, the driver of the towing vehicle 2C as a user manually inputs the type of the connected trailer 3C to the operation panel 9. The operation panel 9 transmits input information 9a from the driver to the ECU 6C. In the ECU 6C, the trailer identification unit 62 refers to the input information 9a to identify the type of the trailer 3C similarly to the first embodiment. Then, the processing change unit 63 reads an arithmetic processing program corresponding to the type of the trailer 3C from the processing information storage unit 64 and causes the data processing unit 61 to execute the arithmetic processing program, so that the content of arithmetic processing executed by the data processing unit 61 is changed, and travel control of the towing vehicle 2C performed by the vehicle control unit 5 is changed.

Figure 8:
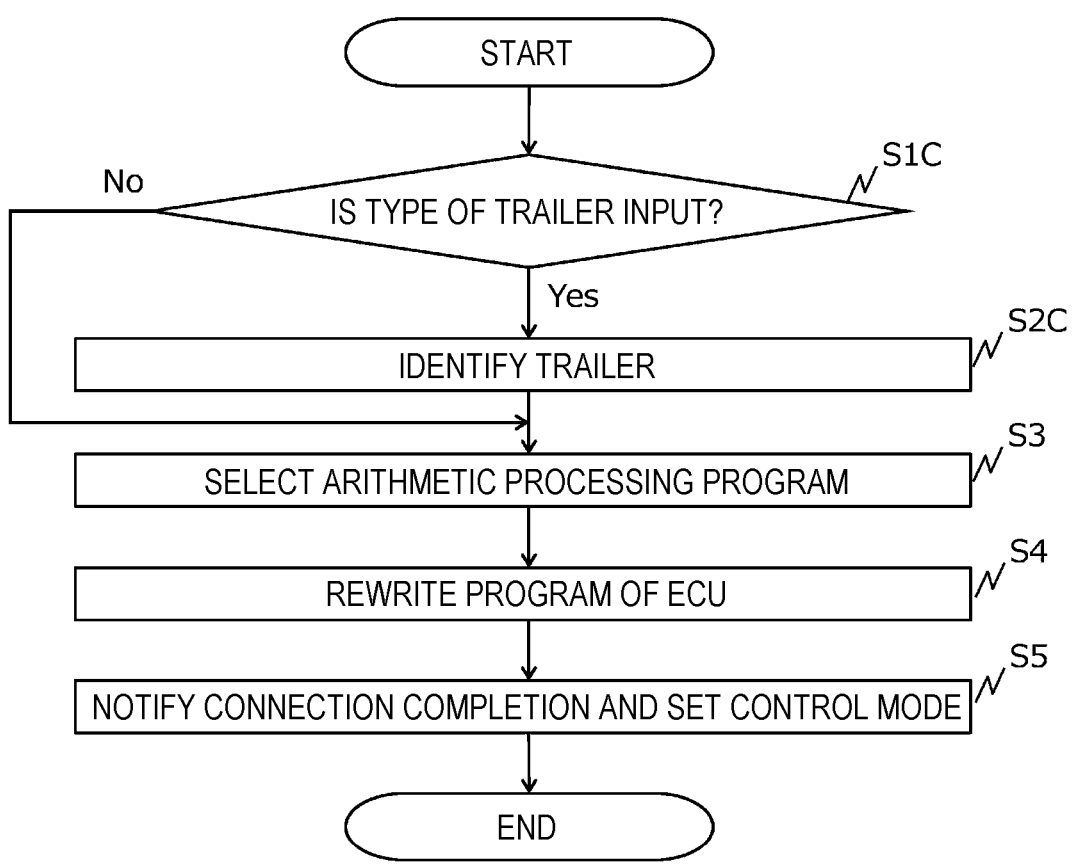
FIG. 8 is a view illustrating an internal processing flow of an ECU according to the fourth embodiment of the present invention.

FIG. 8 is a view illustrating an internal processing flow of the ECU 6C according to the fourth embodiment of the present invention. For example, when an ignition switch of the towing vehicle 2C is turned on and the ECU 6C is supplied with power, the ECU 6C starts the processing flow illustrated in FIG. 8. In FIG. 8, processing having the same content as that in FIG. 2 is denoted by the common step number as that in FIG. 2. Hereinafter, the description of the processing denoted by the common step number will be omitted.

In Step S1C, the ECU 6C determines whether a type of the trailer 3C connected to the towing vehicle 2C is input from a driver via the operation panel 9. When the type of the trailer 3C is input as a result of the determination in Step S1C, it is determined that the trailer 3C is connected, and the processing proceeds to Step S2C. On the other hand, when the type of the trailer 3C was desired to be input, it is determined that the trailer 3C is not connected to the towing vehicle 2C, and the processing skips Step S2C and proceeds to Step S3.

In Step S2C, the ECU 6C causes the trailer identification unit 62 to read the input information 9a transmitted from the operation panel 9, and identifies the type of the connected trailer 3C based on the read input information. Then, information indicating the identified type of the trailer 3C is output to the processing change unit 63 as the trailer identification information 62a.

As described above, the ECU 6C of the towing vehicle 2C can change the content of arithmetic processing for performing the travel control necessary for autonomous driving and driving assistance to an optimum content in accordance with the type of the connected trailer 3C even in the in-vehicle system of the present embodiment, which is similar to the first to third embodiments. As a result, in the articulated vehicle 1C equipped with an autonomous driving function and a driving assistance function, a specification of the towing vehicle 2C including the ECU 6C can be made common without preparing a high-performance common ECU. Therefore, vehicle development cost of a car manufacturer and vehicle purchase cost of the user can be reduced.

Further, since the operation panel 9 configured to manually change the arithmetic processing content of the data processing unit 61 is provided in the towing vehicle 2C in the in-vehicle system of the present embodiment, storage of an identifier and a program becomes unnecessary on the trailer 3C side, and a function of automatically identifying the type of the trailer 3C becomes unnecessary on the towing vehicle 2C side. As a result, it is possible to realize cost reduction in the entire articulated vehicle 1C.

According to the fourth embodiment of the present invention described above, the following operational effects are further achieved in addition to (1) to (4) and (6) to (8) described in the first embodiment.

(12) The trailer identification unit 62 identifies a type of the trailer 3C based on input information from a user. As a result, it is possible to identify the type of the trailer 3C connected to the towing vehicle 2C even in the conventional trailer 3C having no storage mechanism for an identifier and a program.

Note that, in the fourth embodiment of the present invention described above, the description has been given regarding the example in which the content of the arithmetic processing in the data processing unit 61 configured using a computer is changed by acquiring the arithmetic processing program from the processing information storage unit 64 provided in the ECU 6C similarly to the first embodiment. However, the data processing circuit 81 may be configured using the FPGA 8, and the content of the arithmetic processing executed by the data processing circuit 81 and the reconfiguration control unit 82 may be changed by reconfiguring the FPGA 8, which is similar to the second embodiment. In such a case, the ECU 6C may be provided with the circuit information storage unit 65 described in the second embodiment, instead of the processing information storage unit 64.

Fifth Embodiment

Figure 9:
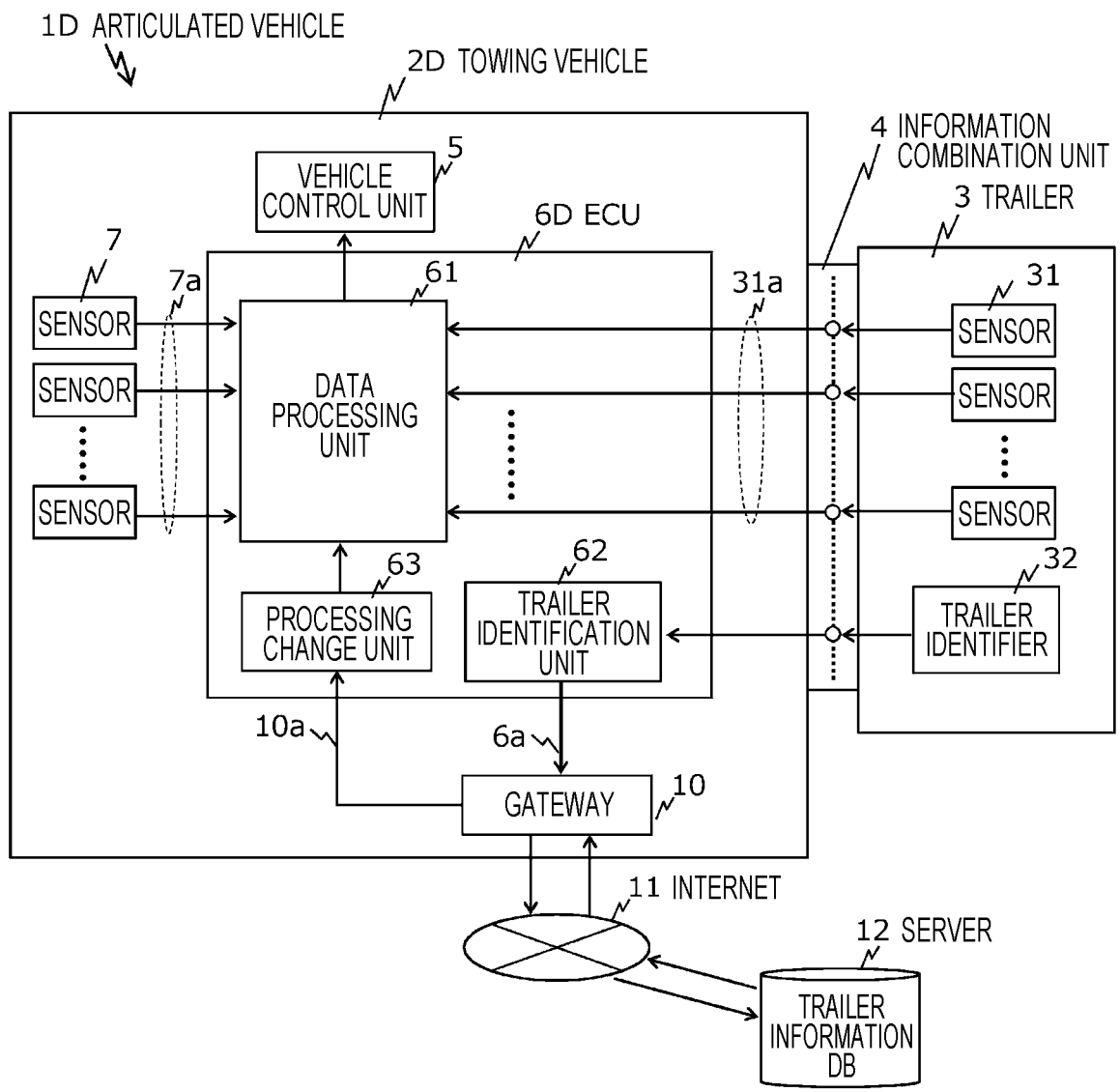
FIG. 9 is a diagram illustrating a configuration of an in-vehicle system according to a fifth embodiment of the present invention.

Next, a fifth embodiment of the present invention will be described. FIG. 9 is a diagram illustrating a configuration of an in-vehicle system according to a fifth embodiment of the present invention. In FIG. 9, the same part as that in FIG. 1 are denoted by the common reference sign as that in FIG. 1. The parts denoted by the common reference sign has the same configuration and operation as that described in the first embodiment, and thus, the description thereof will be omitted below unless otherwise necessary.

In the in-vehicle system illustrated in FIG. 9, an articulated vehicle 1D is configured by connecting a towing vehicle 2D and the trailer 3 to each other by the information combination unit 4. The towing vehicle 2D is equipped with an ECU 6D, which is an electronic control unit, and a gateway 10 having a communication function with the external Internet 11. The ECU 6D includes the data processing unit 61, the trailer identification unit 62, and the processing change unit 63. That is, in the in-vehicle system of the present embodiment, the processing information storage unit 64 of FIG. 1 described in the first embodiment is not provided in the ECU 6D. Instead, a plurality of types of arithmetic processing programs corresponding to a plurality of types of the trailers 3 to which the towing vehicle 2D can be connected are stored in an external server 12. Among them, an arithmetic processing program corresponding to a type of the trailer 3 connected to the towing vehicle 2D is acquired via the Internet 11.

When the trailer 3 is connected to the towing vehicle 2D, the trailer identification unit 62 acquires the trailer identifier 32 from the trailer 3 and identifies the type of the trailer 3, and outputs trailer identification information 6a indicating the type of the trailer 3 to the gateway 10 based on an identification result. The gateway 10 transmits the trailer identification information 6a to the server 12 via the Internet 11. The server 12 stores the latest arithmetic processing programs corresponding to all the types of trailers 3. The arithmetic processing program corresponding to the type of the trailer 3 is read based on the trailer identification information 6a, and data thereof is transmitted to the gateway 10 of the towing vehicle 2D via the Internet 11. In the towing vehicle 2D, the data transmitted from the server 12 is received by the gateway 10, and is input to the ECU 6D as an arithmetic processing program 10a adapted to the trailer 3. In the ECU 6D, the processing change unit 63 changes a content of arithmetic processing executed by the data processing unit 61 using the input arithmetic processing program 10a, and changes travel control of the towing vehicle 2 performed by the vehicle control unit 5.

Figure 10:
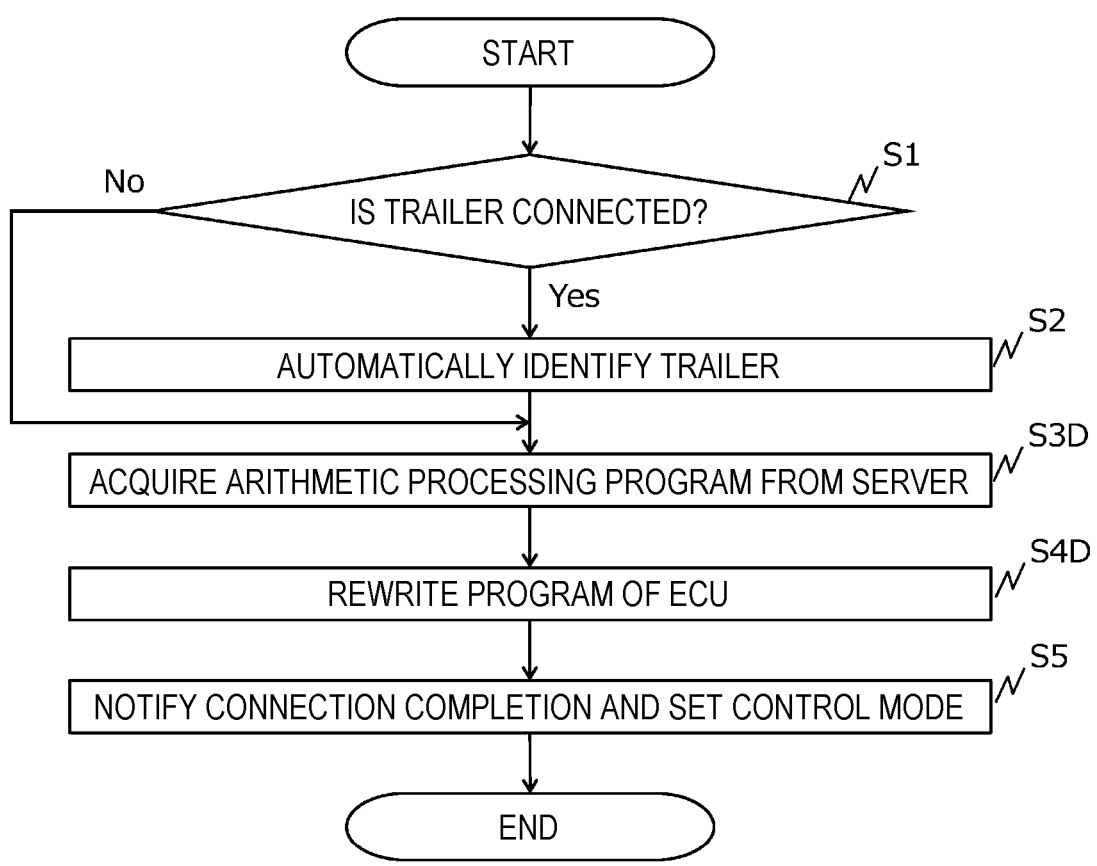
FIG. 10 is a view illustrating an internal processing flow of an ECU according to the fifth embodiment of the present invention.

FIG. 10 is a view illustrating an internal processing flow of the ECU 6D according to the fifth embodiment of the present invention. For example, when an ignition switch of the towing vehicle 2D is turned on and the ECU 6D is supplied with power, the ECU 6D starts the processing flow illustrated in FIG. 10. In FIG. 10, processing having the same content as that in FIG. 2 is denoted by the common step number as that in FIG. 2. Hereinafter, the description of the processing denoted by the common step number will be omitted.

In Step S3D, the ECU 6D acquires an arithmetic processing program optimum for the current towing vehicle 2D from the server 12. At this time, the trailer identification unit 62 outputs information indicating a type of the trailer 3 identified in Step S2 to the gateway 10 as the trailer identification information 6a. Note that, when it is determined in Step S1 that the trailer 3 is not connected, such a fact may be output to the gateway 10 as the trailer identification information 6a. If a request for an arithmetic processing program is made to the server 12 as the trailer identification information 6a is transmitted to the server 12 via the Internet 11 by the gateway 10, an arithmetic processing program corresponding to the type of the trailer 3 is returned from the server 12 in response to the request, and is input to the ECU 6D via the gateway 10.

In Step S4D, the ECU 6D rewrites a program executed by the data processing unit 61 with the arithmetic processing program acquired in Step S3D. As a result, an arithmetic processing content of the data processing unit 61 is changed to the type of the trailer 3 identified in Step S2 or a type suitable for the towing vehicle 2D to travel alone.

As described above, the ECU 6D of the towing vehicle 2D can automatically identify the type of the connected trailer 3, and further, change the content of the arithmetic processing for performing the travel control necessary for autonomous driving and driving assistance to an optimum content in accordance with the type of the trailer 3 even in the in-vehicle system of the present embodiment, which is similar to the first to fourth embodiments. As a result, in the articulated vehicle 1D equipped with an autonomous driving function and a driving assistance function, a specification of the towing vehicle 2D including the ECU 6D can be made common without preparing a high-performance common ECU. Therefore, vehicle development cost of a car manufacturer and vehicle purchase cost of the user can be reduced.

Further, the arithmetic processing program for each type of the trailer 3 is downloaded from the server 12 via the network without being stored in the towing vehicle 2D or the trailer 3 in the in-vehicle system of the present embodiment. As a result, a storage medium for storing the arithmetic processing program is unnecessary on the ECU 6D side, and further reduction in vehicle cost can be realized. In addition, the latest arithmetic processing programs for the various types of trailers 3 are constantly collected and updated in the server 12, and thus, the ECU 6D can be updated using an arithmetic processing program adapted to the trailer 3 even when the latest trailer 3 is connected to the towing vehicle 2D.

According to the fifth embodiment of the present invention described above, the following operational effects are further achieved in addition to (1) to (3) and (5) to (8) described in the first embodiment.

(13) The trailer identification unit 62 transmits the trailer identification information 6a indicating a type of the trailer 3 to the external server 12 using the gateway 10 that is a transmission device connected to the ECU 6D. The processing change unit 63 acquires a program corresponding to the type of the trailer 3 transmitted from the server 12 according to the trailer identification information 6a. As a result, the latest program corresponding to the type of the trailer 3 can be acquired and executed by a computer.

Note that, in the fifth embodiment of the present invention described above, the description has been given regarding the example in which the content of the arithmetic processing is changed for the data processing unit 61 configured using the computer similarly to the first embodiment by acquiring the arithmetic processing program from the server 12. However, the data processing circuit 81 may be configured using the FPGA 8, and the content of the arithmetic processing executed by the data processing circuit 81 and the reconfiguration control unit 82 may be changed by reconfiguring the FPGA 8, which is similar to the second embodiment. In this case, the server 12 may store a plurality of types of circuit information corresponding to the plurality of types of trailers 3 to which the towing vehicle 2D can be connected, and circuit information corresponding to a type of the trailer 3 connected to the towing vehicle 2D may be acquired via the Internet 11 from among the plurality of types of circuit information. In addition, the operation panel 9 for a driver to manually input a type of the trailer 3C connected to the towing vehicle 2D may be installed to identify the type of the trailer 3C based on input information from the driver via the operation panel 9 similarly to the fourth embodiment.

Sixth Embodiment

Figure 11:
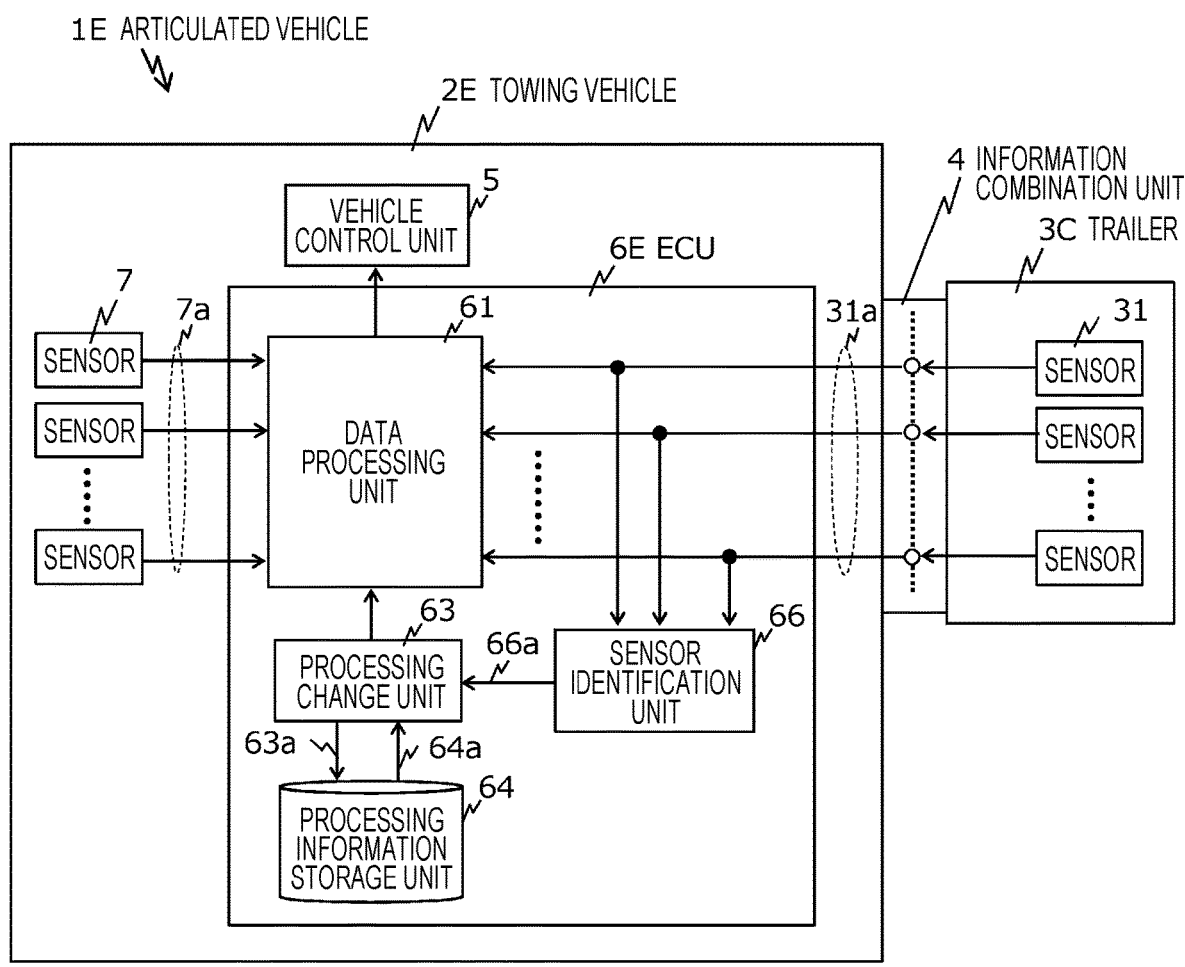
FIG. 11 is a diagram illustrating a configuration of an in-vehicle system according to a sixth embodiment of the present invention.

Next, a sixth embodiment of the present invention will be described. FIG. 11 is a diagram illustrating a configuration of an in-vehicle system according to a sixth embodiment of the present invention. In FIG. 11, the same part as that in FIG. 1 are denoted by the common reference sign as that in FIG. 1. The parts denoted by the common reference sign has the same configuration and operation as that described in the first embodiment, and thus, the description thereof will be omitted below unless otherwise necessary.

In the in-vehicle system illustrated in FIG. 11, an articulated vehicle 1E is configured by connecting a towing vehicle 2E and the trailer 3C to each other by the information combination unit 4. An ECU 6E, which is an electronic control unit, is installed on the towing vehicle 2E. The ECU 6E includes the data processing unit 61, a sensor recognition unit 66, the processing change unit 63, and the processing information storage unit 64. The trailer 3C is the same as that illustrated in FIG. 7 in the fourth embodiment and does not have the trailer identifier 32 of FIG. 1. That is, types of the trailers 3C connected to the towing vehicle 2E are limited in the in-vehicle system of the present embodiment, and the sensor recognition unit 66 configured to a type of the trailer 3C only by information of the sensor group 31 of the trailer 3C is provided in the towing vehicle 2E, instead of the trailer identification unit 62 that identifies the type of the trailer 3 from the trailer identifier 32 described in the first embodiment.

When the trailer 3C is connected, the sensor recognition unit 66 monitors the sensor information 31a input from the sensor group 31 of the trailer 3C to the ECU 6E, and recognizes a type and the number of the sensor group 31 attached to the trailer 3C from a data format of the sensor information 31a. Then, the type of the trailer 3C is identified based on the recognized type and number of the sensor group 31, and trailer identification information 66a indicating an identification result is output to the processing change unit 63. The processing change unit 63 reads an arithmetic processing program corresponding to the type of the trailer 3C indicated by the trailer identification information 66a from the processing information storage unit 64 and causes the data processing unit 61 to execute the arithmetic processing program, so that the content of arithmetic processing executed by the data processing unit 61 is changed, and travel control of the towing vehicle 2E performed by the vehicle control unit 5 is changed.

Figure 12:
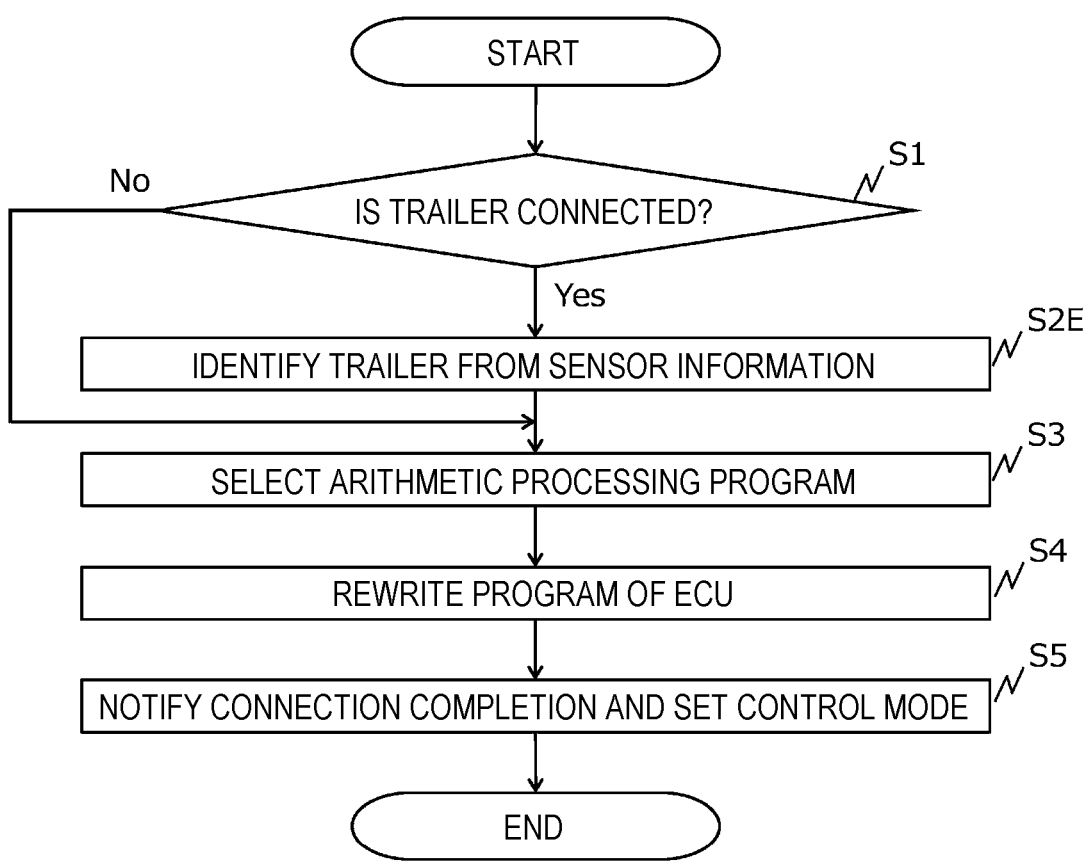
FIG. 12 is a view illustrating an internal processing flow of an ECU according to the sixth embodiment of the present invention.

FIG. 12 is a view illustrating an internal processing flow of the ECU 6E according to the sixth embodiment of the present invention. For example, when an ignition switch of the towing vehicle 2E is turned on and the ECU 6E is supplied with power, the ECU 6E starts the processing flow illustrated in FIG. 12. In FIG. 12, processing having the same content as that in FIG. 2 is denoted by the common step number as that in FIG. 2. Hereinafter, the description of the processing denoted by the common step number will be omitted.

In Step S2E, the ECU 6E causes the sensor recognition unit 66 to acquire the sensor information 31a input from the sensor group 31, and identifies a type of the connected trailer 3C based on the acquired sensor information 31a. Then, information indicating the identified type of the trailer 3C is output to the processing change unit 63 as the trailer identification information 66a.

As described above, the ECU 6E of the towing vehicle 2E can automatically identify the type of the connected trailer 3C, and further, change the content of the arithmetic processing for performing the travel control necessary for autonomous driving and driving assistance to an optimum content in accordance with the type of the trailer 3C even in the in-vehicle system of the present embodiment, which is similar to the first to fifth embodiments. As a result, in the articulated vehicle 1E equipped with an autonomous driving function and a driving assistance function, a specification of the towing vehicle 2E including the ECU 6E can be made common without preparing a high-performance common ECU. Therefore, vehicle development cost of a car manufacturer and vehicle purchase cost of the user can be reduced.

Further, since the sensor recognition unit 66 that identifies the type of the trailer 3C based on the sensor information 31a is provided in the towing vehicle 2E in the in-vehicle system of the present embodiment, it is unnecessary to store an identifier and a program on the trailer 3C side. As a result, it is possible to realize cost reduction in the entire articulated vehicle 1E.

According to the sixth embodiment of the present invention described above, the following operational effects are further achieved in addition to (1) to (4) and (6) to (8) described in the first embodiment.

(14) The sensor recognition unit 66, provided in the ECU 6E instead of the trailer identification unit 62, identifies a type of the trailer 3C based on the sensor information 31a from the sensor group 31. As a result, it is possible to identify the type of the trailer 3C connected to the towing vehicle 2E even in the conventional trailer 3C having no storage mechanism for an identifier and a program.

Note that, in the sixth embodiment of the present invention described above, the description has been given regarding the example in which the content of the arithmetic processing in the data processing unit 61 configured using a computer is changed by acquiring the arithmetic processing program from the processing information storage unit 64 provided in the ECU 6E similarly to the first embodiment. However, the data processing circuit 81 may be configured using the FPGA 8, and the content of the arithmetic processing executed by the data processing circuit 81 and the reconfiguration control unit 82 may be changed by reconfiguring the FPGA 8, which is similar to the second embodiment. In such a case, the ECU 6E may be provided with the circuit information storage unit 65 described in the second embodiment, instead of the processing information storage unit 64. In addition, the content of the arithmetic processing executed by the data processing unit 61 may be changed by acquiring an arithmetic processing program from the external server 12 similarly to the sixth embodiment

Seventh Embodiment

Figure 13:
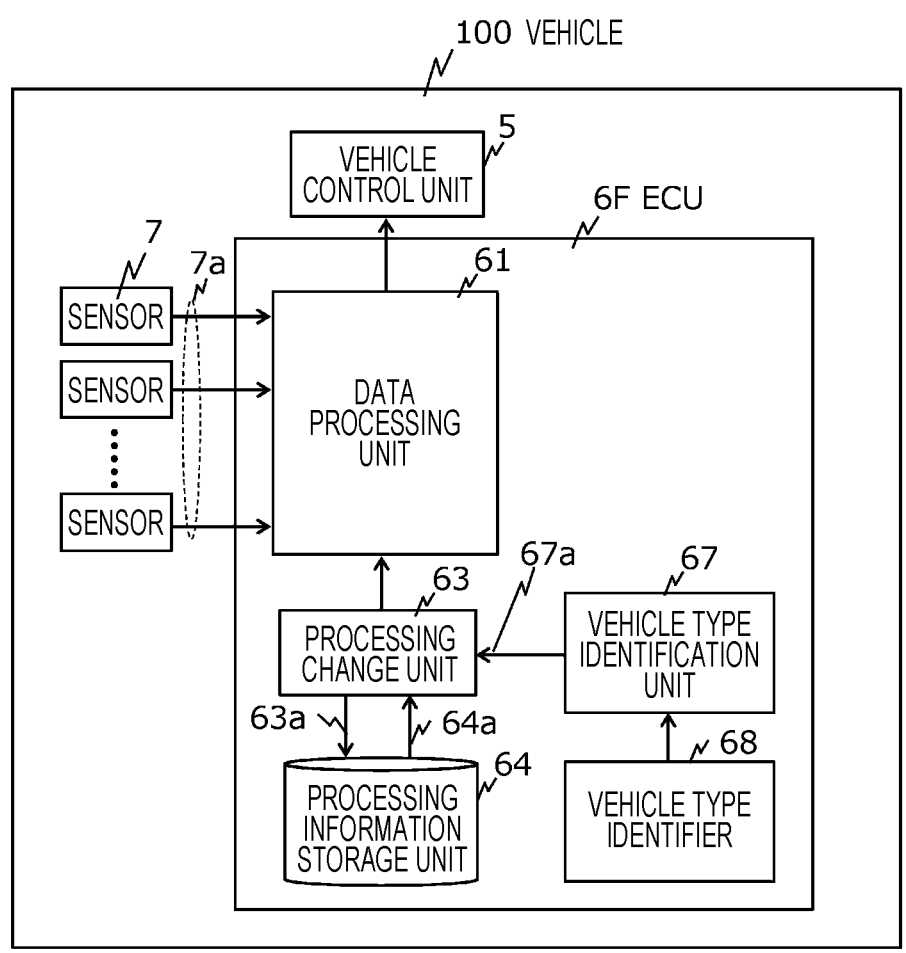
FIG. 13 is a diagram illustrating a configuration of an in-vehicle system according to a seventh embodiment of the present invention.

Next, a seventh embodiment of the present invention will be described. FIG. 13 is a diagram illustrating a configuration of an in-vehicle system according to a seventh embodiment of the present invention. In FIG. 13, the same part as that in FIG. 1 are denoted by the common reference sign as that in FIG. 1. The parts denoted by the common reference sign has the same configuration and operation as that described in the first embodiment, and thus, the description thereof will be omitted below unless otherwise necessary.

The in-vehicle system illustrated in FIG. 13 is used by being installed on a vehicle 100 that travels alone, for example, a truck or the like, instead of the articulated vehicle as described in the first to sixth embodiments. The vehicle 100 is equipped with an ECU 6F, which is an electronic control unit, the vehicle control unit 5, and the sensor group 7. The ECU 6F includes the data processing unit 61, the processing change unit 63, the processing information storage unit 64, a vehicle type identification unit 67, and a vehicle type identifier 68.

The vehicle type identification unit 67 and the vehicle type identifier 68 correspond to the trailer identification unit 62 and the trailer identifier 32 in FIG. 1, respectively, and are used to identify a type of the vehicle 100. The vehicle type identification unit 67 acquires and refers to the vehicle type identifier 68 corresponding to the type of the vehicle 100 at the time of starting an operation of the vehicle 100 to identify the type (vehicle type) of the vehicle 100. A vehicle type identification result obtained by the vehicle type identification unit 67 is output as vehicle type identification information 67a from the vehicle type identification unit 67 to the processing change unit 63. The processing change unit 63 acquires the vehicle type identification result obtained by the vehicle type identification unit 67 based on the vehicle type identification information 67a from the vehicle type identification unit 67, and changes a content of arithmetic processing executed by the data processing unit 61 based on an identification result similarly to the first embodiment. As a result, travel control of the vehicle 100 performed by the vehicle control unit 5 is changed.

Here, in the in-vehicle system of the present embodiment, the type of the vehicle 100 is set according to, for example, a type of a chassis (not illustrated) forming the vehicle 100, and the vehicle type identifier 68 corresponding to this type is stored in the ECU 6F. That is, in general, contents of installed autonomous driving function and driving assistance function are determined for each chassis in a vehicle such as a truck, and these contents are not the same in many cases even in the same vehicle type if the chassis is different. Therefore, in the present embodiment, the type of the vehicle 100 is set according to the type of the chassis, and the content of the arithmetic processing executed by the data processing unit 61 is changed according to the type of the vehicle 100.

Figure 14:
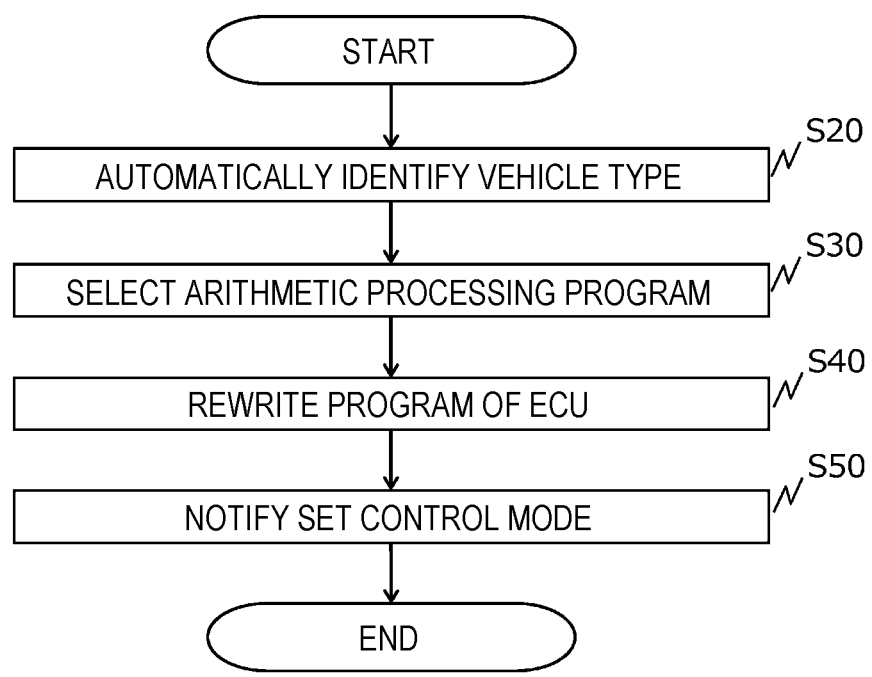
FIG. 14 is a view illustrating an internal processing flow of an ECU according to the seventh embodiment of the present invention.

FIG. 14 is a view illustrating an internal processing flow of the ECU 6F according to the seventh embodiment of the present invention. For example, when an ignition switch of the vehicle 100 is turned on and the ECU 6F is supplied with power, the ECU 6F starts the processing flow illustrated in FIG. 14.

First, in Step S20, the ECU 6F causes the vehicle type identification unit 67 to read the vehicle type identifier 68 stored in advance, and identifies a type (vehicle type) of the vehicle 100 based on the read vehicle type identifier. Then, information indicating the identified type of the vehicle 100 is output to the processing change unit 63 as the vehicle type identification information 67a.

In Step S30, the ECU 6F causes the processing change unit 63 to select an arithmetic processing program optimum for the vehicle 100 from among arithmetic processing programs stored in the processing information storage unit 64. At this time, the processing change unit 63 selects, in Step S30, the arithmetic processing program 64*a* corresponding to the type of the vehicle 100, represented by the vehicle type identification information 67*a*, based on the vehicle type identification information 67*a* output from the vehicle type identification unit 67 in Step S20.

In Step S40, the ECU 6F rewrites a program executed by the data processing unit 61 with the arithmetic processing program selected in Step S30. As a result, the arithmetic processing content of the data processing unit 61 is changed to a content suitable for the type of the vehicle 100 identified in Step S20. Note that, in this arithmetic processing program, the arithmetic processing content of the data processing unit 61 is set such that the travel control of the vehicle 100 is appropriately performed based on the sensor information 7*a* from the sensor group 7 attached to the vehicle 100.

In Step S50, the ECU 6F notifies the vehicle 100 of a set control mode. Here, the control mode corresponding to the travel control realized by the rewritten arithmetic processing program is notified to a driver who is a user of the vehicle 100 through, for example, display on a display panel installed on a driver's seat.

When the notification to the driver is completed in Step S5, the ECU 6 ends the processing flow illustrated in FIG. 14, and the data processing unit 61 starts execution of arithmetic processing using the rewritten arithmetic processing program.

As described above, in the in-vehicle system of the present embodiment, the ECU 6F installed on the vehicle 100 can automatically identify the type of the vehicle 100, and further change the content of arithmetic processing for performing the travel control necessary for autonomous driving and driving assistance to the optimum content according to the type of the vehicle 100. As a result, a specification of the ECU 6F can be made common in the vehicle 100 equipped with the autonomous driving function and the driving assistance function. Therefore, vehicle development cost of a car manufacturer and vehicle purchase cost of the user can be reduced.

According to the seventh embodiment of the present invention described above, the ECU 6F, which is the electronic control unit, is installed on the vehicle 100, and changes the travel control of the vehicle 100 according to the type of the chassis forming the vehicle 100. As a result, it is possible to provide the electronic control unit that realizes the vehicle 100 equipped with the autonomous driving function and the driving assistance function at low cost.

Note that, in the seventh embodiment of the present invention described above, the description has been given regarding the example in which the content of the arithmetic processing in the data processing unit 61 configured using a computer is changed by acquiring the arithmetic processing program from the processing information storage unit 64 provided in the ECU 6F similarly to the first embodiment. However, the data processing circuit 81 may be configured using the FPGA 8, and the content of the arithmetic processing executed by the data processing circuit 81 and the reconfiguration control unit 82 may be changed by reconfiguring the FPGA 8, which is similar to the second embodiment. In such a case, the ECU 6F may be provided with the circuit information storage unit 65 described in the second embodiment, instead of the processing information storage unit 64. In addition, the content of the arithmetic processing executed by the data processing unit 61 may be changed by acquiring an arithmetic processing program from the external server 12 similarly to the sixth embodiment Further, the type of the vehicle 100 may be identified based on the sensor information 7*a* from the sensor group 7 attached to the vehicle 100 similarly to the seventh embodiment.

In the respective embodiments described above, it is preferable to allow data stored in the processing information storage unit 64, the processing information storage unit 33, and the circuit information storage unit 65 to be overwritten or changed at the time of periodic maintenance or the like. In addition, the processing information storage unit 64 and the circuit information storage unit 65 are not limited to internal devices of the ECU, and may be external storage media such as a hard disk, an SSD, and an SD card connected to the outside of the ECU. The processing information storage unit 64 and the circuit information storage unit 65 can be configured in any mode as long as data can be read as necessary. Further, the case where the single trailer is connected to the towing vehicle has been described in each of the first to sixth embodiments described above, but the present invention is similarly applicable to a case where two or more trailers are connected like a double connection truck.

Note that the present invention is not limited to the above-described embodiments, and may include various modifications and equivalent configurations that fall within the scope of the appended claims. For example, a configuration realized by combining the functions described in the respective embodiments is also included. In addition, the above-described embodiments have been described in detail in order to describe the present invention in an easily understandable manner, and the present invention is not necessarily limited to one including the entire configuration that has been described above.

In addition, only a control line and an information line considered to be necessary for the description are illustrated, and all the control lines and information lines required for implementation are not necessarily illustrated. In practice, it can be considered that almost all components are interconnected.

The above-described respective embodiments and various modified examples are merely examples, and the present invention is not limited to these contents unless the features of the invention are impaired. In addition, the various embodiments and modified examples have been described as above, but the present invention is not limited to these contents. Other aspects that can be considered within the scope of the technical ideas of the present invention are also included in the scope of the present invention.

The disclosed content of the following priority application is incorporated herein as the citation.

Japanese Patent Application No. 2019-20050 (filed on Feb. 6, 2019)

REFERENCE SIGNS LIST 1, 1A, 1B, 1C, 1D, 1E articulated vehicle
2, 2A, 2B, 2C, 2D, 2E towing vehicle
3, 3B, 3C trailer (towed vehicle)
4 information combination unit
5 vehicle control unit
6, 6A, 6B, 6C, 6D, 6E, 6F ECU (electronic control unit)
7 sensor
8 FPGA
9 operation panel
10 gateway
11 Internet
12 server 31 sensor
32 trailer identifier
33 processing information storage unit
61 data processing unit
62 trailer identification unit
63 processing change unit
64 processing information storage unit
65 circuit information storage unit
66 sensor recognition unit
67 vehicle type identification unit
68 vehicle type identifier
81 data processing circuit
82 reconfiguration control unit
100 vehicle

The invention claimed is:

1. An electronic control unit installed on a vehicle connected to a trailer and capable of towing the trailer, the electronic control unit comprising one or more memory devices storing instructions thereon, that, when executed by one or more processors, cause the one or more processors to:
identify, based on data collected by a sensor, whether the trailer is connected to the vehicle;
identify, based on the data collected by the sensor, a type of the trailer; and
change a travel control of the vehicle according to the type of the trailer when the trailer is connected to the vehicle,
wherein the one or more memory devices are configured to store a plurality of programs executable by the electronic control unit to change the travel control of the vehicle, and
wherein the instructions cause the one or more processors to acquire a program corresponding to the type of the trailer from among the plurality of programs stored in the one or more memory devices.

2. The electronic control unit according to claim 1, wherein the instructions cause the one or more processors to:
acquire sensor information corresponding to a surrounding environment of the trailer and execute arithmetic processing related to travel control of the vehicle based on the acquired sensor information, the sensor information being output from a sensor attached to the trailer; and
change a content of the executed arithmetic processing based on an identification result of the type of the trailer to change the travel control of the vehicle.

3. The electronic control unit according to claim 2, wherein the instructions cause the one or more processors to:
execute the acquired program to change the content of the executed arithmetic processing.

4. The electronic control unit according to claim 3, wherein the instructions cause the one or more processors to:
transmit trailer identification information indicating the type of the trailer to an external server using a transmission device connected to the electronic control unit, and
acquire a program corresponding to the type of the trailer transmitted from the server according to the trailer identification information.

5. The electronic control unit according to claim 2, wherein
the electronic control unit is configured using a reconfigurable arithmetic processing circuit in which a plurality of logic circuits are combined, and
the instructions cause the one or more processors to acquire circuit information corresponding to the type of the trailer identified, and reconfigure the arithmetic processing circuit using the acquired circuit information to change the content of the executed arithmetic processing.

6. The electronic control unit according to claim 5, wherein
the one or more memory devices store a plurality of types of circuit information for reconfiguring the arithmetic processing circuit, and
wherein the instructions cause the one or more processors to acquire circuit information corresponding to the type of the trailer from among the plurality of types of circuit information stored in the one or more memory devices.

7. The electronic control unit according to claim 5, wherein the instructions cause the one or more processors to:
transmit trailer identification information indicating the type of the trailer to an external server using a transmission device connected to the electronic control unit, and
acquire circuit information corresponding to the type of the trailer transmitted from the server according to the trailer identification information.

8. The electronic control unit according to claim 2, wherein the instructions cause the one or more processors to acquire an identifier corresponding to the type of the trailer from the trailer, and identify the type of the trailer based on the acquired identifier.

9. The electronic control unit according to claim 2 wherein the instructions cause the one or more processors to identify the type of the trailer based on input information from a user.

10. The electronic control unit according to claim 2, wherein the instructions cause the one or more processors to identify the type of the trailer based on the sensor information.

11. The electronic control unit according to claim 1, wherein the instructions cause the one or more processors to:
acquire sensor information corresponding to a surrounding environment of the trailer and execute arithmetic processing related to travel control of the vehicle based on the acquired sensor information, the sensor information being output from a sensor attached to the trailer; and
acquire processing information corresponding to the type of the trailer from the trailer, and change a content of the executed arithmetic processing based on the acquired processing information to change the travel control of the vehicle.

12. The electronic control unit according to claim 2, wherein the type of the trailer is set based on at least one of a type, a number, and an attachment position of the sensor.

13. The electronic control unit according to claim 1, wherein
when the trailer is not connected to the vehicle, sensor information corresponding to a surrounding environment of the vehicle is acquired, the sensor information being output from a sensor attached to the vehicle, and travel control of the vehicle is changed so as to perform the travel control of the vehicle based on the acquired sensor information.

14. The electronic control unit according to claim 1, wherein a user is notified of a travel control mode of the vehicle set according to the type of the trailer.

15. An electronic control unit installed on a vehicle, the electronic control unit comprising one or more memory devices storing instructions thereon, that, when executed by one or more processors, cause the one or more processors to:

identify, based on sensor information output from a sensor, whether a trailer is connected to the vehicle;
identify, based on the sensor information output from the sensor, a type of chassis of the vehicle;
identify a program corresponding to the type of chassis of the vehicle from among a plurality of programs stored in the one or more memory devices; and
execute the identified program to change a travel control of the vehicle.

\* \* \* \* \*